United States Patent
Lezzi

(10) Patent No.: US 11,820,703 B2
(45) Date of Patent: Nov. 21, 2023

(54) LOW-MODULUS ION-EXCHANGEABLE GLASSES WITH ENHANCED THERMAL PROPERTIES FOR MANUFACTURING

(71) Applicant: CORNING INCORPORATED, Corning, NY (US)

(72) Inventor: Peter Joseph Lezzi, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/962,772

(22) Filed: Oct. 10, 2022

(65) Prior Publication Data

US 2023/0117763 A1 Apr. 20, 2023

Related U.S. Application Data

(60) Provisional application No. 63/255,625, filed on Oct. 14, 2021.

(51) Int. Cl.
*C03C 3/087* (2006.01)
*C03C 21/00* (2006.01)

(52) U.S. Cl.
CPC ............ *C03C 21/002* (2013.01); *C03C 3/087* (2013.01); *C03C 2201/50* (2013.01)

(58) Field of Classification Search
CPC .............................. C03C 3/087; C03C 21/002
See application file for complete search history.

(56) References Cited

U.S. PATENT DOCUMENTS

| 3,673,049 A | 6/1972 | Giffen et al. |
| 6,436,859 B1 | 8/2002 | Muramoto et al. |
| 6,518,211 B1 | 2/2003 | Bradshaw et al. |
| RE44,869 E | 4/2014 | Ellison et al. |
| 8,854,623 B2 | 10/2014 | Fontaine et al. |
| 9,290,413 B2 | 3/2016 | Dejneka et al. |
| 9,701,580 B2 * | 7/2017 | Smedskjaer ............ C03C 3/091 |

(Continued)

FOREIGN PATENT DOCUMENTS

| CN | 104768889 B | 5/2020 |
| CN | 112479587 A | 3/2021 |

(Continued)

OTHER PUBLICATIONS

International Search Report and Written Opinion of the International Searching Authority; PCT/US22/44181; dated Jan. 9, 2022, 9 pages; European Patent Office.

*Primary Examiner* — Noah S Wiese
(74) *Attorney, Agent, or Firm* — Jeffrey A. Schmidt

(57) ABSTRACT

Ion-exchanged alkali aluminosilicate glass articles with a ratio of peak compressive stress value to Young's modulus value of 15 or more. The glass articles may include $Al_2O_3$ mol %+RO mol %$\geq$17 mol %, where RO mol %=MgO mol %+CaO mol %, and be substantially free of ZnO, SrO, BaO, $B_2O_3$, $P_2O_5$, $Li_2O$, and $K_2O$. The glass articles may have a peak compressive stress value in a range of 500 MPa to 1300 MPa. The glass articles are suitable for various high-strength applications, including cover glass applications that experience significant bending stresses during use, for example, cover glasses for flexible displays.

22 Claims, 5 Drawing Sheets

(56) References Cited

U.S. PATENT DOCUMENTS

| | | | |
|---|---|---|---|
| 9,714,192 B2 | 7/2017 | Ellison et al. | |
| 10,125,044 B2 | 11/2018 | Gross et al. | |
| 10,377,663 B2 | 8/2019 | Li et al. | |
| 2008/0020919 A1* | 1/2008 | Murata | C03C 21/002 501/66 |
| 2009/0197088 A1* | 8/2009 | Murata | C03C 3/091 65/30.14 |
| 2013/0224491 A1* | 8/2013 | Smedskjaer | C03C 3/091 501/67 |
| 2013/0302618 A1 | 11/2013 | Kuhnemann et al. | |
| 2015/0132579 A1 | 5/2015 | Guo et al. | |
| 2017/0320769 A1* | 11/2017 | Guo | C03C 4/18 |
| 2021/0179482 A1 | 6/2021 | Ezzi et al. | |
| 2021/0269353 A1 | 9/2021 | Gross | |
| 2022/0242774 A1 | 8/2022 | Deng et al. | |

FOREIGN PATENT DOCUMENTS

| | | | |
|---|---|---|---|
| EP | 2692706 B1 * | 3/2016 | C03C 21/002 |
| WO | 2021/117000 A1 | 6/2021 | |

* cited by examiner

LOW-MODULUS ION-EXCHANGEABLE GLASSES WITH ENHANCED THERMAL PROPERTIES FOR MANUFACTURING

CROSS-REFERENCE TO RELATED APPLICATION

This application claims the benefit of priority under 35 U.S.C. § 119 of U.S. Provisional Application Ser. No. 63/255,625 filed on Oct. 14, 2021, the content of which is relied upon and incorporated herein by reference in its entirety.

FIELD

The present disclosure relates to ion-exchangeable glass compositions. Specifically, aspects described herein relate to ion-exchangeable glass compositions for use in various industries, for example, consumer electronics, transportation, architecture, defense, medicine, and packaging. Even more specifically, the present disclosure relates to glass compositions for cover glass applications, for example, cover glass for a flexible display.

BACKGROUND

Many consumer products, for example smart phones, tablets, portable media players, personal computers, and cameras, incorporate cover glasses that may function as display covers, and may incorporate touch functionality. Frequently, these devices are dropped by users onto hard surfaces, which can cause damage to the cover glasses, and may negatively impact the use of the devices, for example, the touch functionality may be compromised.

Foldable or flexible displays for consumer electronics applications may benefit from thin, flexible ion-exchanged glass. Glass can be made more resistant to flexure failure through ion-exchange processes, which involve inducing compressive stresses on the glass surfaces. The compressive stress introduced using an ion-exchange process serves to, among other things, arrest flaws that can cause failure of the glass.

Therefore, a continuing need exists for ion-exchangeable glass compositions having desirable mechanical properties for use in a variety of applications, including cover glass applications.

BRIEF SUMMARY

The present disclosure is directed to ion-exchangeable glass compositions having suitable strength and flexibility for various applications, for example cover glass applications for electronic devices. The glass compositions are designed to maximize a ratio of peak compressive stress value to Young's modulus value. A high ratio, for example a ratio of 15 or more, allows the glass compositions to resist failure during a bending event. Also, the strength imparted to the glass compositions by an ion-exchange process provides the glass composition with desirable mechanical properties for resisting fracture during use. The glass compositions can also exhibit desirable thermal properties (for example, liquidus temperature and/or liquidus viscosity) for optimizing some manufacturing techniques used to form the compositions into glass articles. Furthermore, the glass compositions can resist undesirably high ion-exchange rates, which can aid in controlling ion-exchange within the glass composition during some ion-exchanges processes.

A first aspect (1) of the present application is directed to an ion-exchanged alkali aluminosilicate glass article, the glass article comprising: greater than or equal to 55 mol % $SiO_2$; greater than or equal to 12.5 mol % to less than or equal to 16.0 mol % $Al_2O_3$; greater than or equal to 1 mol % to less than or equal to 3.88 mol % MgO; greater than or equal to 0.78 mol % to less than or equal to 3 mol % CaO; and $Na_2O$, where $Al_2O_3$ mol %+RO mol %≥17 mol % and RO mol %=MgO mol %+CaO mol %, and where the glass article is substantially free of ZnO, SrO, BaO, $B_2O_3$, $P_2O_5$, $Li_2O$, and $K_2O$.

In a second aspect (2), the alkali aluminosilicate glass article according to the first aspect (1) comprises: a Young's modulus value measured in GPa before being ion-exchanged; and a compressive stress layer extending from a surface of the glass article to a depth of compression, the compressive stress layer comprising a peak compressive stress value measured in MPa, where a ratio of the peak compressive stress value to the Young's modulus value is greater than or equal to 15.

In a third aspect (3), the ratio of the peak compressive stress value to the Young's modulus value according to the second aspect (2) is greater than or equal to 15 to less than or equal to 18.

In a fourth aspect (4), the Young's modulus value according to the second aspect (2) or the third aspect (3) is in a range of greater than or equal to 70 MPa to less than or equal to 80 MPa.

In a fifth aspect (5), the peak compressive stress value according to any one of aspects (2)-(4) is in a range of greater than or equal to 500 MPa to less than or equal to 1300 MPa.

In a sixth aspect (6), the depth of compression according to any one of aspects (2)-(5) is in a range of greater than or equal to 5 microns to less than or equal to 30 microns.

In a seventh aspect (7), the depth of compression according to any one of aspects (2)-(6) is in a range of greater than or equal to 5% to less than or equal to 20% of a thickness of the glass article.

In an eighth aspect (8), the ion-exchanged alkali aluminosilicate glass article according to any one of aspect (1)-(7) is provided and $Na_2O$ mol %+RO mol %≥20 mol %.

In a ninth aspect (9), the ion-exchanged alkali aluminosilicate glass article of any one of aspects (1)-(8) is provided and ($Na_2O$ mol %+RO mol %−$Al_2O_3$ mol %)≥4 mol %.

In a tenth aspect (10), the ion-exchanged alkali aluminosilicate glass article according to any one of aspects (1)-(8) is provided and 11 mol %≥($Na_2O$ mol %+RO mol %−$Al_2O_3$ mol %)≥4 mol %.

In an eleventh aspect (11), the ion-exchanged alkali aluminosilicate glass article according to any one of aspects (1)-(10) is provided and 21 mol %≥$Al_2O_3$ mol %+RO mol %≥17 mol %.

In a twelfth aspect (12), the ion-exchanged alkali aluminosilicate glass article according to any one of aspects (1)-(11) is provided and 37 mol %≥$Al_2O_3$ mol %+$Na_2O$ mol %≥28 mol %.

In a thirteenth aspect (13), the ion-exchanged alkali aluminosilicate glass article according to any one of aspects (1)-(12) is provided and (MgO mol %/(MgO mol %+CaO mol %))≥0.5.

In a fourteenth aspect (14), the ion-exchanged alkali aluminosilicate glass article according to any one of aspects (1)-(12) is provided and 0.8≥(MgO mol %/(MgO mol %+CaO mol %))≥0.5.

In a fifteenth aspect (15), the ion-exchanged alkali aluminosilicate glass article according to any one of aspects (1)-(14) comprises greater than or equal to 1.92 mol % to less than or equal to 3.88 mol % MgO.

In a sixteenth aspect (16), the ion-exchanged alkali aluminosilicate glass article according to any one of aspects (1)-(15) comprises greater than or equal to 0.78 mol % to less than or equal to 2.52 mol % CaO.

In a seventeenth aspect (17), the ion-exchanged alkali aluminosilicate glass article according to any one of aspects (1)-(16) comprises greater than or equal to 59 mol % to less than or equal to 66 mol % $SiO_2$; and greater than or equal to 16 mol % to less than or equal to 21 mol % $Na_2O$.

In an eighteenth aspect (18), the ion-exchanged alkali aluminosilicate glass article according to any one of aspects (1)-(14) comprises: greater than or equal to 64 mol % to less than or equal to 66 mol % $SiO_2$; greater than or equal to 13 mol % to less than or equal to 15 mol % $Al_2O_3$; greater than or equal to 2 mol % to less than or equal to 3.88 mol % MgO; greater than or equal to 0.78 mol % to less than or equal to 2 mol % CaO; and greater than or equal to 15.5 mol % to less than or equal to 17.5 mol % $Na_2O$.

In a nineteenth aspect (19), the ion-exchanged alkali aluminosilicate glass article according to any one of aspects (1)-(14) comprises: greater than or equal to 59.6 mol % to less than or equal to 65.5 mol % $SiO_2$; greater than or equal to 12.78 mol % to less than or equal to 15.96 mol % $Al_2O_3$; greater than or equal to 1.92 mol % to less than or equal to 3.88 mol % MgO; greater than or equal to 0.78 mol % to less than or equal to 2.52 mol % CaO; and greater than or equal to 16.09 mol % to less than or equal to 20.2 mol % $Na_2O$.

In a twentieth aspect (20), the ion-exchanged alkali aluminosilicate glass article according to any one of aspects (1)-(19) comprises a thickness of less than or equal to 4 millimeters.

In a twenty-first aspect (21), the ion-exchanged alkali aluminosilicate glass article according to any one of aspects (1)-(19) comprises a thickness in a range of greater than or equal to 15 microns to less than or equal to 300 microns.

In a twenty-second aspect (22), the ion-exchanged alkali aluminosilicate glass article according to any one of aspect (1)-(21) comprises a liquidus viscosity in a range of greater than or equal to 500 kP to less than or equal to 2300 kP, measured before being ion-exchanged.

In a twenty-third aspect (23), the ion-exchanged alkali aluminosilicate glass article according to any one of aspects (1) or (8)-(22) comprises a compressive stress layer extending from a surface of the glass article to a depth of compression, the compressive stress layer comprising a peak compressive stress value in a range of greater than or equal to 500 MPa to less than or equal to 1300 MPa.

A twenty-fourth aspect (24) of the present application is directed to an electronic device comprising an electronic display; and the glass article according to any one of aspects (1)-(23) disposed over the electronic display.

In a twenty-fifth aspect (25), the electronic device according to the twenty-fourth aspect (24) further comprises a housing comprising a front surface, a back surface, and side surfaces; and electrical components at least partially within the housing, the electrical components comprising a controller, a memory, and the electronic display, the electronic display at or adjacent the front surface of the housing, where the glass article forms at least a portion of the housing.

A twenty-sixth aspect (26) of the present application is directed to an ion-exchanged alkali aluminosilicate glass article comprising: greater than or equal to 59 mol % to less than or equal to 66 mol % $SiO_2$; greater than or equal to 12.5 mol % to less than or equal to 16.0 mol % $Al_2O_3$; greater than or equal to 1 mol % to less than or equal to 3.88 mol % MgO; greater than or equal to 0.78 mol % to less than or equal to 3 mol % CaO; greater than or equal to 16 mol % to less than or equal to 21 mol % $Na_2O$; a Young's modulus value measured in GPa before ion-exchanging the glass article; and a compressive stress layer extending from a surface of the ion-exchanged glass article and having a peak compressive stress value measured in MPa, where $Al_2O_3$ mol %+RO mol %≥17 mol % and RO mol %=MgO mol %+CaO mol %, where the glass article is substantially free of ZnO, SrO, BaO, $B_2O_3$, $P_2O_5$, $Li_2O$, and $K_2O$, and where a ratio of the peak compressive stress value to the Young's modulus value is greater than or equal to 15 to less than or equal to 18.

A twenty-seventh aspect (27) of the present application is directed to an ion-exchanged alkali aluminosilicate glass article comprising: greater than or equal to 55 mol % $SiO_2$; greater than or equal to 12.5 mol % to less than or equal to 16 mol % $Al_2O_3$; greater than or equal to 1 mol % to less than or equal to 4 mol % MgO; greater than or equal to 0.5 mol % to less than or equal to 3 mol % CaO; and $Na_2O$, where $Al_2O_3$ mol %+RO mol %≥17 mol % and where RO mol %=MgO mol %+CaO mol %, and where the glass article is substantially free of ZnO, SrO, BaO, $B_2O_3$, $P_2O_5$, $Li_2O$, and $K_2O$.

In a twenty-eight aspect (28), the ion-exchanged alkali aluminosilicate glass article according to the twenty-seventh aspect (27) comprises: a Young's modulus value measured in GPa before being ion-exchanged; and a compressive stress layer extending from a surface of the glass article to a depth of compression, the compressive stress layer comprising a peak compressive stress value measured in MPa, where a ratio of the peak compressive stress value to the Young's modulus value is greater than or equal to 15.

A twenty-ninth aspect (29) of the present application is directed to a method of strengthening an alkali aluminosilicate glass article, the method comprising: immersing the alkali aluminosilicate glass article in an ion-exchange solution comprising greater than or equal to 50 wt % of a potassium salt, the glass article comprising: greater than or equal to 55 mol % $SiO_2$; greater than or equal 12.5 mol % to less than or equal to 16.0 mol % $Al_2O_3$; greater than or equal to 1 mol % to less than or equal to 3.88 mol % MgO; greater than or equal to 0.78 mol % to less than or equal to 3 mol % CaO; and $Na_2O$, where $Al_2O_3$ mol %+RO mol %≥17 mol % and RO mol %=MgO mol %+CaO mol %, and where the glass article is substantially free of ZnO, SrO, BaO, $B_2O_3$, $P_2O_5$, $Li_2O$, and $K_2O$. The method comprising ion-exchanging the glass article in the ion-exchange solution for a time period in a range of greater than or equal to 5 minutes to less than or equal to 24 hours at a temperature in a range of greater than or equal to 350° C. to less than or equal to 480° C. to achieve a compressive stress layer extending from a surface of the glass article to a depth of compression and comprising a peak compressive stress value in a range of greater than or equal to 500 MPa to less than or equal to 1300 MPa.

In a thirtieth aspect (30), the method of strengthening the alkali aluminosilicate glass article according to the twenty-ninth aspect (29) comprises a Young's modulus value measured in GPa before being ion-exchanged, and a ratio of the peak compressive stress value to the Young's modulus value is greater than or equal to 15.

In a thirty-first aspect (31), the method of strengthening the alkali aluminosilicate glass article according to the twenty-ninth aspect (29) comprises a Young's modulus value measured in GPa before being ion-exchanged, and the ratio of the peak compressive stress value to the Young's modulus value is greater than or equal to 15 to less than or equal to 18.

In a thirty-second aspect (32), the Young's modulus value according to the thirtieth aspect (30) or the thirty-first aspect (31) is in a range of greater than or equal to 70 MPa to less than or equal to 80 MPa.

In a thirty-third aspect (33), the depth of compression according to any one of aspects (29)-(32) is in a range of greater than or equal to 5 microns to less than or equal to 30 microns.

In a thirty-fourth aspect (34), the depth of compression according to any one of aspects (29)-(33) is in a range of greater than or equal to 5% to less than or equal to 20% of a thickness of the glass article.

In a thirty-fifth aspect (35), the method according to any one of aspects (29)-(34) is provided and wherein the glass article comprises $Na_2O$ mol %+RO mol %≥20 mol %.

In a thirty-sixth aspect (36), the method according to any one of aspects (29)-(35) is provided and wherein the glass article comprises ($Na_2O$ mol %+RO mol %−$Al_2O_3$ mol %)≥4 mol %.

In a thirty-seventh aspect (37), the method according to any one of aspects (29)-(35) is provided and wherein the glass article comprises 11 mol %≥($Na_2O$ mol %+RO mol %−$Al_2O_3$ mol %)≥4 mol %.

In a thirty-eighth aspect (38), the method according to any one of aspects (29)-(37) is provided and wherein the glass article comprises 21 mol %≥$Al_2O_3$ mol %+RO mol %≥17 mol %.

In a thirty-ninth aspect (39), the method according to any one of aspects (29)-(38) is provided and wherein the glass article comprises 37 mol %≥$Al_2O_3$ mol %+$Na_2O$ mol %≥28 mol %.

In a fortieth aspect (40), the method according to any one of aspects (29)-(39) is provided and (MgO mol %/(MgO mol %+CaO mol %))≥0.5.

In a forty-first aspect (41), the method according to any one of aspects (29)-(39) is provided and wherein the glass article comprises 0.8≥(MgO mol %/(MgO mol %+CaO mol %))≥0.5.

In a forty-second aspect (42), the method of strengthening the ion-exchanged alkali aluminosilicate glass article according to any one of aspects (29)-(41) wherein the glass article comprises greater than or equal to 1.92 mol % to less than or equal to 3.88 mol % MgO.

In a forty-third aspect (43), the method of strengthening the ion-exchanged alkalo aluminosilicate glass article according to any one of aspects (29)-(42) wherein the glass article comprises greater than or equal to 0.78 mol % to less than or equal to 2.52 mol % CaO.

In a forty-fourth aspect (44), the method of strengthening the ion-exchanged alkali aluminosilicate glass article according to any one of aspects (29)-(43) wherein the glass article comprises greater than or equal to 59 mol % to less than or equal to 66 mol % $SiO_2$; and greater than or equal to 16 mol % to less than or equal to 21 mol % $Na_2O$.

In a forty-fifth aspect (45), the method of strengthening the ion-exchanged alkali aluminosilicate glass article according to any one of aspects (29)-(41) wherein the glass article comprises greater than or equal to 64 mol % to less than or equal to 66 mol % $SiO_2$; greater than or equal to 13 mol % to less than or equal to 15 mol % $Al_2O_3$; greater than or equal to 2 mol % to less than or equal to 3.88 mol % MgO; greater than or equal to 0.78 mol % to less than or equal to 2 mol % CaO; and greater than or equal to 15.5 mol % to less than or equal to 17.5 mol % $Na_2O$.

In a forty-sixth aspect (46), the method of strengthening the ion-exchanged alkali aluminosilicate glass article according to any one of aspects (29)-(41) wherein the glass article comprises greater than or equal to 59.6 mol % to less than or equal to 65.5 mol % $SiO_2$; greater than or equal to 12.78 mol % to less than or equal to 15.96 mol % $Al_2O_3$; greater than or equal to 1.92 mol % to less than or equal to 3.88 mol % MgO; greater than or equal to 0.78 mol % to less than or equal to 2.52 mol % CaO; and greater than or equal to 16.09 mol % to less than or equal to 20.2 mol % $Na_2O$.

In a forty-seventh aspect (47), the method of strengthening the ion-exchanged alkali aluminosilicate glass article according to any one of aspects (29)-(46) wherein the glass article comprises a thickness of less than or equal to 4 millimeters.

In a forty-eighth aspect (48), the method of strengthening the ion-exchanged alkali aluminosilicate glass article according to any one of aspects (29)-(46) wherein the glass article comprises a thickness in a range of greater than or equal to 15 microns to less than or equal to 300 microns.

In a forty-ninth aspect (49) the method of strengthening the alkali aluminosilicate glass article according to any one of aspects (29)-(48) wherein the glass article comprises a liquidus viscosity in a range of greater than or equal to 500 kP to less than or equal to 2300 kP, measured before being ion-exchanged.

BRIEF DESCRIPTION OF THE DRAWINGS

The accompanying figures, which are incorporated herein, form part of the specification and illustrate aspects of the present disclosure. Together with the description, the figures further serve to explain the principles of and to enable a person skilled in the relevant art(s) to make and use the disclosed aspects. These figures are intended to be illustrative, not limiting. Although the disclosure is generally described in the context of these aspects, it should be understood that it is not intended to limit the scope of the disclosure to these particular aspects. In the drawings, like reference numbers indicate identical or functionally similar elements.

DETAILED DESCRIPTION

Figure 1:
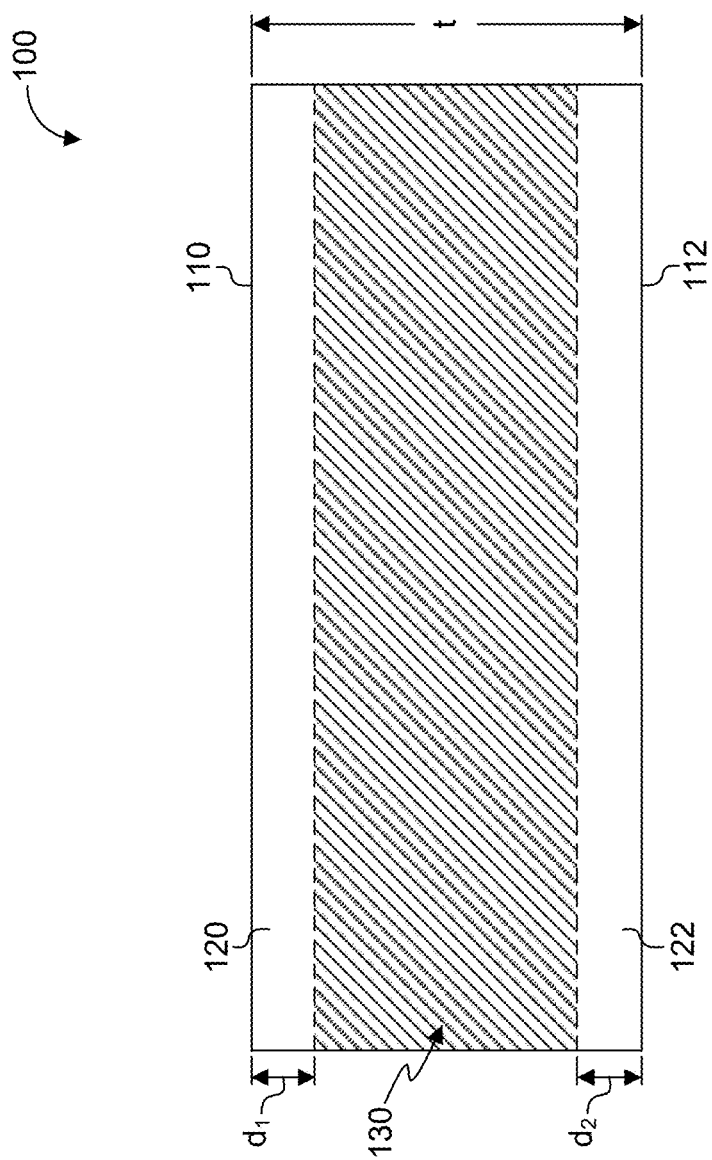
FIG. 1 illustrates a cross section of a glass article having compressive stress regions according to aspects.

The following examples are illustrative, but not limiting, of the present disclosure. Other suitable modifications and adaptations of the variety of conditions and parameters normally encountered in the field, and which would be apparent to those skilled in the art, are within the spirit and scope of the disclosure.

Glasses described herein are a family of ion-exchangeable alkali aluminosilicate glasses that may be ion-exchanged to achieve high peak compressive stress. As used herein, "ion-exchangeable" means that a glass composition, or glass article comprising the composition, is capable of exchanging first cations located at or near the surface of the substrate with second cations of the same valence. The first ions may be ions of sodium. The second ions may be ions of one of potassium, rubidium, and cesium, with the proviso that the second ion has an ionic radius greater than the ionic radius of the first ion. The first ion is present in the glass-based substrate as an oxide thereof (e.g., $Na_2O$). As used herein, "ion-exchanged glass" or "chemically strengthened glass" means the glass has been subject to at least one ion-exchange process that exchanges cations located at or near the surface of the glass with cations of the same valence.

Glass compositions described herein can be ion-exchanged to achieve a high peak compressive stress. In aspects, the glasses described herein may be ion-exchanged to achieve a peak compressive stress of about 500 MPa or more, and up to about 1400 MPa. High peak compressive stress imparted during an ion-exchange process can provide high strength for glasses with shallow flaw size distributions, thereby preventing failure during bending. The high peak compressive stress allows the glass to retain net compression and thus contain surface flaws when the glass is subjected to bending around a tight radius. Glasses according to aspects described herein have low Young's moduli, which results in a lower bending stress values during bending, and can thus prevent failure during a bending event.

In addition, glass compositions described herein have a ratio of peak compressive stress value to Young's modulus value (peak compressive stress value/Young's modulus value, CS/E, where CS is in MPa and E is in GPa) of 15 or more across a broad depth of compression range for compressive regions created by an ion-exchange process. Increasing this ratio is difficult because surface compressive stresses imparted during an ion-exchange process can have a strong influence from Young's modulus in that a higher Young's modulus is a common path to improving compressive stress. That is, Young's modulus is a measure of the stiffness of the network. For example, exchanging a K+ ion into a Na+ site gives compressive stress, but as the network becomes stiffer (as by increasing Young's modulus) then the dilatational stress is higher. Therefore one common way to get a higher CS is to just increase the Young's modulus, but what has been done in this disclosure is to increase CS without significantly increasing Young's modulus. With a high CS/E ratio, the glass compositions can remain flexible even after ion-exchange. Glass compositions described herein have a low enough Young's modulus before ion-exchange and the value of compressive stress that can be imparted during an ion-exchange process is high enough to achieve a high CS/E ratio across a broad depth of compression range. This results in glass compositions that are flexible and also accept high surface compressive stress values. The glass compositions are able to accept high surface compressive stresses with large depths of compression, for example depths as high as 50 micrometers (microns and/or μm), because the compositions resist stress relaxation that can occur during an ion-exchange process. Stress relaxation, which can be more pronounced with elevated temperature and time, is apt to occur during ion-exchange processes designed to impart high depths of compression. These characteristics of the glass compositions described herein make them suitable for various industrial applications, including high-strength cover glass applications that experience significant bending stresses in use, for example, as cover glass in flexible and foldable displays.

As used herein, "peak compressive stress" refers to the highest compressive stress (CS) value measured within a compressive stress region. In aspects, the peak compressive stress is located at the surface of the glass. In other aspects, the peak compressive stress may occur at a depth below the surface, giving the compressive stress profile the appearance of a "buried peak." Unless specified otherwise, compressive stress (including surface CS) is measured by surface stress meter (FSM) using commercially available instruments for example the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient."

As used herein, "depth of compression" (DOC) refers to the depth at which the stress within the glass article changes from compressive to tensile. At the DOC, the stress crosses from a compressive stress to a tensile stress and thus exhibits a stress value of zero. Depth of compression and depth of layer may be measured by a surface stress meter, for example, a FSM-6000 surface stress meter. As used herein, "depth of layer" (DOL) refers to the depth within a glass article at which an ion of a metal oxide diffuses into the glass article where the concentration of the ion reaches a minimum value. In situations, for example where only potassium is ion-exchanged into a glass article, DOC can equal DOL. Unless specified otherwise herein, DOC and DOL are used interchangeably in this disclosure.

Glass compositions described herein can also be manufactured at reasonable cost. The glass compositions exhibit suitability high liquidus temperatures and suitably low liquidus viscosities for certain manufacturing techniques, for example slot drawing. These thermal properties can increase ease of manufacturing glass articles made from the compositions, which can reduce cost. Glass compositions described in this disclosure have, among other things, an aluminum oxide content, a magnesium oxide content, a calcium oxide, and a sodium oxide content that aid in melting during manufacturing. In aspects, the glass compositions can have a liquidus viscosity in a range of greater than or equal to 500 kP (kilopoise) to less than or equal to 2300 kP. In aspects, the glass compositions can have a liquidus temperature of greater than or equal to 500° C.

Glass compositions described herein can provide one or more of the following benefits. (1) The compositions are lithium free, but are capable of achieving high compressive stress values during ion-exchange (for example, up to 1400 MPa) with small depths of compression (DOC) and up to about 1100 MPa with a DOC of 20 microns (micrometers, μm), and even with a higher DOC of about 40 microns. (2) The compositions have a low modulus, which facilitates higher CS/E ratios and improves bendability for thin foldable applications. (3) Raw materials to make these glasses are cheap and readily available. (4) The compositions have a high per-modifier content, which allows for easier melting. A "per-modifier" content for a glass composition means that the value for ($R_2O$ mol %+RO mol %−$Al_2O_3$ mol %) is greater than 0 mol %, where $R_2O$ mol % is the total mol % of all alkali metal oxides in the composition and where RO mol % is the total mol % of all alkali earth metal oxides in the composition. (5) The compositions have low liquidus temperatures, high liquidus viscosities, and slow-growing liquidus phases, which are all beneficial for sheet forming. (6) The compositions can resist a high ion-exchange rate when exposed to a molten salt bath, which can enable improved manufacturing process control. In other words, the compositions can ion-exchange relatively slowly, which can be beneficial for controlling ion-exchange within the composition. For example, the DOC for an ion-exchanged glass article can be more precisely controlled for a relatively slow ion-exchange rate within the composition. Precisely controlled DOC may be particularly beneficial for thin glass articles (for example, glass articles having a thickness of less than or equal to 500 microns) because the DOC can quickly approach a desired depth within the glass article.

Starting from basic fracture toughness equations, which dictate the relationship between glass strength expressed in terms of total stress ($\sigma_{net}$), the flaw size (a), and the fracture toughness of the material ($K_{IC}$), the benefits of the CS/E ratios described herein can be demonstrated. Fracture toughness can be expressed in terms of the following equation $$K_{IC} = Y\sigma_{net}\sqrt{\pi a} \quad \text{(Equation 1)}$$

In Equation 1, "Y" is a geometrical factor and $\sigma_{net} = \sigma_{bend} - \sigma_{IOX}$, where $\sigma_{bend}$ is the bend stress applied to a glass article and $\sigma_{IOX}$ is the compressive stress applied to the glass article by an ion-exchange exchange. For small flaw sizes, $\sigma_{IOX}$ can be equivalent to the peak compressive stress (SC). $\sigma_{bend}$ can be expressed using the following equation for a plate spacing distance (D) measured in millimeters during a bend test, wherein E=Young's Modulus of the glass composition measured in pascals, v is the Poisson's ratio of the glass composition, and h=is the thickness of the glass article measured in microns.

$$\sigma_{bend} = \frac{1.198E}{1-v^2}\left(\frac{h}{D-h}\right) \quad \text{(Equation 2)}$$

By making a series of substitutions, the following equation can be used to express the glass strength ($\sigma_{net}$). $Z_{h,D}$ can be considered essentially constant because the Poisson's ratio for alkali aluminosilicate glasses is approximately 0.21.

$$\sigma_{net} = E\left[\frac{1.198}{1-v^2}\left(\frac{h}{D-h}\right) - \frac{CS}{E}\right] = E\left[Z_{h,D} - \frac{CS}{E}\right] \quad \text{(Equation 3)}$$

Figure 4:
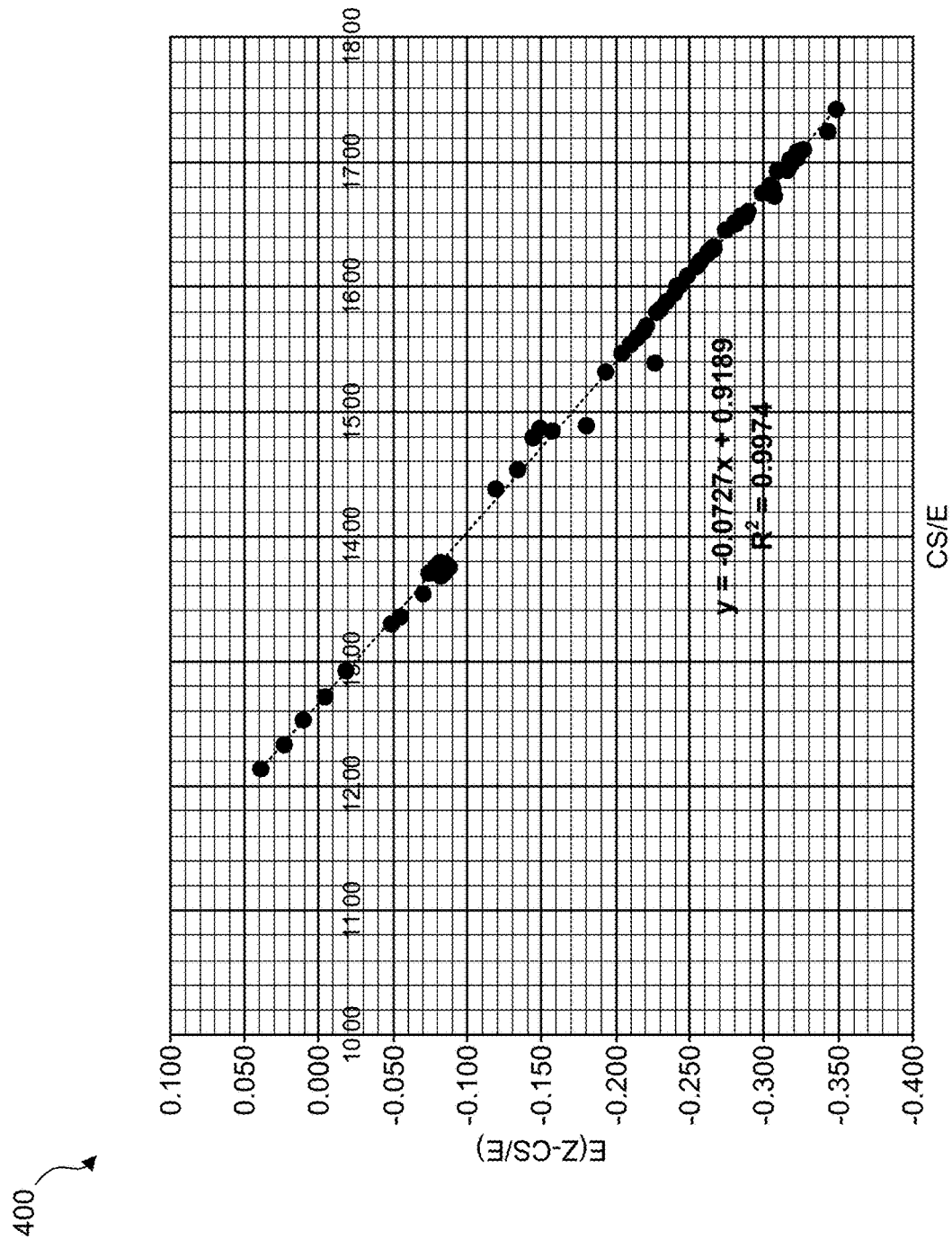
FIG. 4 is a graph of calculated glass strength versus for CS/E ratio for various exemplary ion-exchanged glass compositions.

Graph 400 in FIG. 4 shows a plot of $$E\left[Z_{h,D} - \frac{CS}{E}\right]$$

versus CS/E ratio for 80 exemplary glass compositions. The CS/E ratios in graph 400 were measured on 30-micron thickness glass articles having a DOC of 20 microns. The glass strength values in FIG. 4 were calculated based on a 30-micron thick glass article and a plate spacing distance (D) of 3 millimeters. As shown in graph 400, $$E\left[Z_{h,D} - \frac{CS}{E}\right]$$

is directly proportional to the CS/E ratio such that the following relationship can be derived.

$$E\left[Z_{h,D} - \frac{CS}{E}\right] \propto \frac{CS}{E} \quad \text{(Equation 4)}$$

Accordingly, it can be stated that ($\sigma_{net}$) is directly proportional to the CS/E according to the following relationship.

$$\sigma_{net} \propto \frac{CS}{E} \quad \text{(Equation 5)}$$

Thus, by increasing the CS/E ratio, the glass strength (and) can be increased. Increasing the CS/E ratio can, among other things, enable a tighter bending radius for the same thickness glass, enable bending of a higher glass thickness to the same plate spacing distance (D) without failure of the glass, and improve manufacturing yields due to a larger flaw tolerance. These benefits can be quantified using Equations 1-5 and by considering the following comparison of two glass compositions having the Young's Modulus and peak compressive stress values summarized in Table 1. Composition A (CA) in Table 1 is a composition composed of: 68.95 mol % $SiO_2$, 10.27 mol % $Al_2O_3$, 5.36 MgO, 0.06 mol % CaO, 15.20 $Na_2O$, and 0.17 mol % $SnO_2$. Composition 44 (C44) in Table 1 is Composition C44 described in Table 2G.

TABLE 1

| Gomposition | E (GPa) | CS (MPa) |
|---|---|---|
| CA | 71.3 | 700 |
| C44 | 72.5 | 835 |

A 30-micron thick glass article composed of CA and having a 30% $K_{1C}$ flaw size of 0.264 microns can be safely bent to a plate spacing distance (D) of about 3 mm at a bending stress of about 901 MPa, which results in a $\sigma_{net}$ of 201 MPa. In comparison, a 30-micron thick glass article composed of C44 with the same flaw size can be safely bent to a tighter plate spacing distance (D) of 2.66 mm while maintaining a $\sigma_{net}$ of 201 MPa. Relatedly, a 34-micron thick glass article composed of C44 with the same flaw size can be safely bent to a plate spacing distance (D) of 3 mm while maintaining a $\sigma_{net}$ of 201 MPa.

Further, a 30-micron thick glass article composed of CA can be safely bent to a plate spacing (D) of 3 mm, which results in a $\sigma_{net}$ of 201 MPa, and corresponds to a 30% $K_{1C}$ flaw size of 0.264 microns. In comparison, a 30-micron thick glass article composed of C44 can be safely bent to a plate spacing distance (D) of 3 mm, which results in a $\sigma_{net}$ of only 81 MPa. With a $\sigma_{net}$ of only 81 MPa, the glass article composed of C44 could tolerate a 30% $K_{1C}$ flaw size of up to 1.626 microns.

As used herein, the term "glass" is meant to include any material made at least partially of glass, including glass and glass-ceramics. "Glass-ceramics" include materials produced through controlled crystallization of glass. One or more nucleating agents, for example, titanium oxide ($TiO_2$), zirconium oxide ($ZrO_2$), sodium oxide ($Na_2O$), and phosphorus oxide ($P_2O_5$) may be added to a glass-ceramic composition to facilitate homogenous crystallization.

For glass compositions described herein, the concentration of constituent components (e.g., $SiO_2$, $Al_2O_3$, $Na_2O$, and the like) are given in mole percent (mol %) on an oxide basis, unless otherwise specified. Components of the glass compositions according to aspects are discussed individually below. It should be understood that any of the variously recited ranges of one component may be individually combined with any of the variously recited ranges for any other component. As used herein, a trailing 0 in a number is intended to represent a significant digit for that number. For example, the number "1.0" includes two significant digits, and the number "1.00" includes three significant digits. As used herein, a composition described as including an oxide within a range defined by 0 mol % as the lower bound means that the composition includes the oxide at any amount above 0 mol % (e.g., 0.01 mol % or 0.1 mol %) and up to the upper bound of the range.

$SiO_2$ may be the largest constituent in the glass composition and, as such, is the primary constituent of the glass network formed from the glass composition. Pure $SiO_2$ has a relatively low coefficient of thermal expansion (CTE—as used herein this property is measured at a temperature from 0° C. to 300° C.) and is alkali free. However, pure $SiO_2$ has a high melting point. Accordingly, if the concentration of $SiO_2$ in the glass composition is too high, the formability of the glass composition may be diminished as higher concentrations of $SiO_2$ increase the difficulty of melting the glass, which, in turn, adversely impacts the formability of the glass.

In aspects, the glass composition may include $SiO_2$ in an amount greater than or equal to 55 mol % $SiO_2$, greater than or equal to 56 mol % $SiO_2$, greater than or equal to 57 mol % $SiO_2$, greater than or equal to 58 mol % $SiO_2$, greater than or equal to 59 mol % $SiO_2$, greater than or equal to 60 mol % $SiO_2$, greater than or equal to 61 mol % $SiO_2$, greater than or equal to 62 mol % $SiO_2$, greater than or equal to 63 mol % $SiO_2$, greater than or equal to 64 mol % $SiO_2$, greater than or equal to 65 mol % $SiO_2$, or greater than or equal to 66 mol % $SiO_2$. In aspects the glass composition may include $SiO_2$ in an amount less than or equal to 70 mol % $SiO_2$, less than or equal to 69 mol % $SiO_2$, less than or equal to 68 mol % $SiO_2$, less than or equal to 67 mol % $SiO_2$, less than or equal to 66 mol % $SiO_2$, less than or equal to 65 mol % $SiO_2$, less than or equal to 64 mol % $SiO_2$, less than or equal to 63 mol % $SiO_2$, less than or equal to 62 mol % $SiO_2$, less than or equal to 61 mol % $SiO_2$, or less than or equal to 60 mol % $SiO_2$.

Any of the above $SiO_2$ ranges may be combined with any other range. For example, in aspects, the glass composition may include $SiO_2$ in an amount greater than or equal to 55 mol % $SiO_2$ to less than or equal to 70 mol % $SiO_2$, greater than or equal to 55 mol % $SiO_2$ to less than or equal to 69 mol % $SiO_2$, greater than or equal to 55 mol % $SiO_2$ to less than or equal to 68 mol % $SiO_2$, greater than or equal to 55 mol % $SiO_2$ to less than or equal to 67 mol % $SiO_2$, greater than or equal to 55 mol % $SiO_2$ to less than or equal to 66 mol % $SiO_2$, greater than or equal to 55 mol % $SiO_2$ to less than or equal to 65 mol % $SiO_2$, greater than or equal to 55 mol % $SiO_2$ to less than or equal to 64 mol % $SiO_2$, greater than or equal to 55 mol % $SiO_2$ to less than or equal to 63 mol % $SiO_2$, greater than or equal to 55 mol % $SiO_2$ to less than or equal to 62 mol % $SiO_2$, greater than or equal to 55 mol % $SiO_2$ to less than or equal to 61 mol % $SiO_2$, greater than or equal to 55 mol % $SiO_2$ to less than or equal to 60 mol % $SiO_2$, greater than or equal to 56 mol % $SiO_2$ to less than or equal to 70 mol % $SiO_2$, greater than or equal to 57 mol % $SiO_2$ to less than or equal to 70 mol % $SiO_2$, greater than or equal to 58 mol % $SiO_2$ to less than or equal to 70 mol % $SiO_2$, greater than or equal to 59 mol % $SiO_2$ to less than or equal to 70 mol % $SiO_2$, greater than or equal to 60 mol % $SiO_2$ to less than or equal to 70 mol % $SiO_2$, greater than or equal to 61 mol % $SiO_2$ to less than or equal to 70 mol % $SiO_2$, greater than or equal to 62 mol % $SiO_2$ to less than or equal to 70 mol % $SiO_2$, greater than or equal to 63 mol % $SiO_2$ to less than or equal to 70 mol % $SiO_2$, greater than or equal to 64 mol % $SiO_2$ to less than or equal to 70 mol % $SiO_2$, or greater than or equal to 65 mol % $SiO_2$ to less than or equal to 70 mol % $SiO_2$.

In aspects, the glass composition may include $SiO_2$ in an amount greater than or equal to 59 mol % $SiO_2$ to less than or equal to 66 mol % $SiO_2$, including subranges. For example, in aspects, the glass composition may include $SiO_2$ in an amount greater than or equal to 60 mol % $SiO_2$ to less than or equal to 66 mol % $SiO_2$, greater than or equal to 61 mol % $SiO_2$ to less than or equal to 66 mol % $SiO_2$, greater than or equal to 62 mol % $SiO_2$ to less than or equal to 66 mol % $SiO_2$, greater than or equal to 63 mol % $SiO_2$ to less than or equal to 66 mol % $SiO_2$, greater than or equal to 64 mol % $SiO_2$ to less than or equal to 66 mol % $SiO_2$, greater than or equal to 65 mol % $SiO_2$ to less than or equal to 66 mol % $SiO_2$, greater than or equal to 59 mol % $SiO_2$ to less than or equal to 65 mol % $SiO_2$, greater than or equal to 59 mol % $SiO_2$ to less than or equal to 64 mol % $SiO_2$, greater than or equal to 59 mol % $SiO_2$ to less than or equal to 63 mol % $SiO_2$, greater than or equal to 59 mol % $SiO_2$ to less than or equal to 62 mol % $SiO_2$, greater than or equal to 59 mol % $SiO_2$ to less than or equal to 61 mol % $SiO_2$, or greater than or equal to 59 mol % $SiO_2$ to less than or equal to 60 mol % $SiO_2$.

In aspects, the glass composition may include $SiO_2$ in an amount greater than or equal to 59.6 mol % $SiO_2$ to less than or equal to 65.5 mol % $SiO_2$, including subranges. For example, in aspects, the glass composition may include $SiO_2$ in an amount greater than or equal to 60.0 mol % $SiO_2$ to less than or equal to 65.5 mol % $SiO_2$, greater than or equal to 60.5 mol % $SiO_2$ to less than or equal to 65.5 mol % $SiO_2$, greater than or equal to 61.0 mol % $SiO_2$ to less than or equal to 65.5 mol % $SiO_2$, greater than or equal to 61.5 mol % $SiO_2$ to less than or equal to 65.5 mol % $SiO_2$, greater than or equal to 62.0 mol % $SiO_2$ to less than or equal to 65.5 mol % $SiO_2$, greater than or equal to 62.5 mol % $SiO_2$ to less than or equal to 65.5 mol % $SiO_2$, greater than or equal to 63.0 mol % $SiO_2$ to less than or equal to 65.5 mol % $SiO_2$, greater than or equal to 59.6 mol % $SiO_2$ to less than or equal to 65.0 mol % $SiO_2$, greater than or equal to 59.6 mol % $SiO_2$ to less than or equal to 64.5 mol % $SiO_2$, greater than or equal to 59.6 mol % $SiO_2$ to less than or equal to 64.0 mol % $SiO_2$, greater than or equal to 59.6 mol % $SiO_2$ to less than or equal to 63.5 mol % $SiO_2$, greater than or equal to 59.6 mol % $SiO_2$ to less than or equal to 63.0 mol % $SiO_2$, or greater than or equal to 59.6 mol % $SiO_2$ to less than or equal to 62.5 mol % $SiO_2$.

Glass compositions disclosed herein include $Al_2O_3$. The addition of $Al_2O_3$ may serve as a glass network former. Furthermore, when the concentration of $Al_2O_3$ is balanced against the concentration of $SiO_2$ and the concentration of alkali oxides in the composition, it may reduce the liquidus temperature of the glass melt, thereby enhancing the liquidus viscosity.

In aspects, the mol % of $Al_2O_3$ plus the mol % of RO ($Al_2O_3$ mol %+RO mol %) in the composition may be greater than or equal to 17 mol %. In aspects, $Al_2O_3$ mol %+RO mol % may be greater than or equal to 17 mol % to less than or equal to 21 mol % (for example, 21 mol %≥$Al_2O_3$ mol %+RO mol %≥17 mol %), including subranges. In aspects, $Al_2O_3$ mol %+RO mol % may be greater than or equal to 18 mol %, greater than or equal to 19 mol %, or greater than or equal to 20 mol %. In aspects, $Al_2O_3$ mol %+RO mol % may be less than or equal to 20 mol %, less than or equal to 19 mol %, or less than or equal to 18 mol %. In the above equation, RO mol % equals MgO mol % plus CaO mol %.

Any of the above ranges may be combined with any other range. For example, in aspects, $Al_2O_3$ mol %+RO mol % may be greater than or equal to 17 mol % to less than or equal to 21 mol %, greater than or equal to 18 mol % to less than or equal to 21 mol %, greater than or equal to 19 mol % to less than or equal to 21 mol %, greater than or equal to 17 mol % to less than or equal to 20 mol %, or greater than or equal to 17 mol % to less than or equal to 19 mol %.

The ($Al_2O_3$ mol %+RO mol %) values described above benefit the glass compositions disclosed herein. With the ($Al_2O_3$ mol %+RO mol %) values as described above, the glass compositions are able to achieve the high peak compressive stresses across a broad depth of compression range as discussed herein. If ($Al_2O_3$ mol %+RO mol %) is below 17 mol %, then desirably high ion-exchange stresses may not be formed. If ($Al_2O_3$ mol %+RO mol %) is above 21 mol %, then the ion-exchange process can be too slow and/or the Young's modulus can be undesirably high. Also, the manufacturability of a glass composition can suffer from a value above 21 mol %.

In aspects, the glass composition may include $Al_2O_3$ in an amount of greater than or equal to 12.5 mol % to less than or equal to 16.0 mol % $Al_2O_3$, including subranges. For example, in aspects, the glass composition can include $Al_2O_3$ in an amount of greater than or equal to 13.0 mol % to less than or equal to 16.0 mol % $Al_2O_3$, greater than or equal to 13.5 mol % to less than or equal to 16.0 mol % $Al_2O_3$, greater than or equal to 14.0 mol % to less than or equal to 16.0 mol % $Al_2O_3$, greater than or equal to 14.5 mol % to less than or equal to 16.0 mol % $Al_2O_3$, greater than or equal to 15.0 mol % to less than or equal to 16.0 mol % $Al_2O_3$, greater than or equal to 12.5 mol % to less than or equal to 15.5 mol % $Al_2O_3$, greater than or equal to 12.5 mol % to less than or equal to 15.0 mol % $Al_2O_3$, greater than or equal to 12.5 mol % to less than or equal to 14.5 mol % $Al_2O_3$, greater than or equal to 12.5 mol % to less than or equal to 14.0 mol % $Al_2O_3$, or greater than or equal to 12.5 mol % to less than or equal to 13.5 mol % $Al_2O_3$.

In aspects, the glass composition may include $Al_2O_3$ in an amount of greater than or equal to 13 mol % to less than or equal to 15 mol % $Al_2O_3$, including subranges. For example, in aspects, the glass composition can include $Al_2O_3$ in an amount of greater than or equal to 13.5 mol % to less than or equal to 15 mol % $Al_2O_3$, greater than or equal to 14 mol % to less than or equal to 15 mol % $Al_2O_3$, greater than or equal to 14.5 mol % to less than or equal to 15 mol % $Al_2O_3$, greater than or equal to 13 mol % to less than or equal to 14.5 mol % $Al_2O_3$, greater than or equal to 13 mol % to less than or equal to 14.0 mol % $Al_2O_3$, or greater than or equal to 13 mol % to less than or equal to 13.5 mol % $Al_2O_3$.

In aspects, the glass composition may include $Al_2O_3$ in an amount of greater than or equal to 12.78 mol % to less than or equal to 15.96 mol % $Al_2O_3$, including subranges. For example, in aspects, the glass composition can include $Al_2O_3$ in an amount of greater than or equal to 13.0 mol % to less than or equal to 15.96 mol % $Al_2O_3$, greater than or equal to 13.25 mol % to less than or equal to 15.96 mol % $Al_2O_3$, greater than or equal to 13.5 mol % to less than or equal to 15.96 mol % $Al_2O_3$, greater than or equal to 13.75 mol % to less than or equal to 15.96 mol % $Al_2O_3$, greater than or equal to 14.0 mol % to less than or equal to 15.96 mol % $Al_2O_3$, greater than or equal to 14.25 mol % to less than or equal to 15.96 mol % $Al_2O_3$, greater than or equal to 14.5 mol % to less than or equal to 15.96 mol % $Al_2O_3$, greater than or equal to 14.75 mol % to less than or equal to 15.96 mol % $Al_2O_3$, greater than or equal to 15.0 mol % to less than or equal to 15.96 mol % $Al_2O_3$, greater than or equal to 12.78 mol % to less than or equal to 15.75 mol % $Al_2O_3$, greater than or equal to 12.78 mol % to less than or equal to 15.5 mol % $Al_2O_3$, greater than or equal to 12.78 mol % to less than or equal to 15.25 mol % $Al_2O_3$, greater than or equal to 12.78 mol % to less than or equal to 15.0 mol % $Al_2O_3$, greater than or equal to 12.78 mol % to less than or equal to 14.75 mol % $Al_2O_3$, greater than or equal to 12.78 mol % to less than or equal to 14.5 mol % $Al_2O_3$, greater than or equal to 12.78 mol % to less than or equal to 14.25 mol % $Al_2O_3$, greater than or equal to 12.78 mol % to less than or equal to 14.0 mol % $Al_2O_3$, or greater than or equal to 12.78 mol % to less than or equal to 13.75 mol % $Al_2O_3$.

In aspects, the glass composition may include $Al_2O_3$ in an amount of greater than or equal to 12.5 mol % to less than or equal to 16 mol % $Al_2O_3$, including subranges. For example, in aspects, the glass composition can include $Al_2O_3$ in an amount of greater than or equal to 13 mol % to less than or equal to 16 mol % $Al_2O_3$, greater than or equal to 14 mol % to less than or equal to 16 mol % $Al_2O_3$, greater than or equal to 12.5 mol % to less than or equal to 15 mol % $Al_2O_3$, or greater than or equal to 12.5 mol % to less than or equal to 14 mol % $Al_2O_3$.

Glass compositions described herein include $Na_2O$. $Na_2O$ may aid in the ion-exchangeability of the glass composition, and improve the formability, and thereby manufacturability, of the glass composition. However, if too much $Na_2O$ is added to the glass composition, the CTE may be too low, and the melting point may be too high. Further, if too much $Na_2O$ is added to the glass composition, the ion-exchange rate of the glass may be too high in some cases to allow for precise control of ion-exchange within the composition.

In aspects, the glass composition may include $Na_2O$ in an amount greater than or equal to 16 mol % to less than or equal to 21 mol % $Na_2O$, including subranges. For example, in aspects, the glass composition may include $Na_2O$ in an amount greater than or equal to 16.5 mol % to less than or equal to 21 mol % $Na_2O$, greater than or equal to 17 mol % to less than or equal to 21 mol % $Na_2O$, greater than or equal to 17.5 mol % to less than or equal to 21 mol % $Na_2O$, greater than or equal to 18 mol % to less than or equal to 21 mol % $Na_2O$, greater than or equal to 18.5 mol % to less than or equal to 21 mol % $Na_2O$, greater than or equal to 19 mol % to less than or equal to 21 mol % $Na_2O$, greater than or equal to 19.5 mol % to less than or equal to 21 mol % $Na_2O$, greater than or equal to 20 mol % to less than or equal to 21 mol % $Na_2O$, greater than or equal to 16 mol % to less than or equal to 20.5 mol % $Na_2O$, greater than or equal to 16 mol % to less than or equal to 20 mol % $Na_2O$, greater than or equal to 16 mol % to less than or equal to 19.5 mol % $Na_2O$, greater than or equal to 16 mol % to less than or equal to 19 mol % $Na_2O$, greater than or equal to 16 mol % to less than or equal to 18.5 mol % $Na_2O$, greater than or equal to 16 mol % to less than or equal to 18 mol % $Na_2O$, or greater than or equal to 16 mol % to less than or equal to 17.5 mol % $Na_2O$.

In aspects, the glass composition may include $Na_2O$ in an amount greater than or equal to 15.5 mol % to less than or equal to 17.5 mol % $Na_2O$, including subranges. For example, in aspects, the glass composition may include $Na_2O$ in an amount greater than or equal to 15.75 mol % to less than or equal to 17.5 mol % $Na_2O$, greater than or equal to 16.0 mol % to less than or equal to 17.5 mol % $Na_2O$, greater than or equal to 16.25 mol % to less than or equal to 17.5 mol % $Na_2O$, greater than or equal to 16.5 mol % to less than or equal to 17.5 mol % $Na_2O$, greater than or equal to 16.75 mol % to less than or equal to 17.5 mol % $Na_2O$, greater than or equal to 17.0 mol % to less than or equal to 17.5 mol % $Na_2O$, greater than or equal to 15.5 mol % to less than or equal to 17.25 mol % $Na_2O$, greater than or equal to 15.5 mol % to less than or equal to 17.0 mol % $Na_2O$, greater than or equal to 15.5 mol % to less than or equal to 16.75 mol % $Na_2O$, greater than or equal to 15.5 mol % to less than or equal to 16.5 mol % $Na_2O$, greater than or equal to 15.5 mol % to less than or equal to 16.25 mol % $Na_2O$, or greater than or equal to 15.5 mol % to less than or equal to 16.0 mol % $Na_2O$.

In aspects, the glass composition may include $Na_2O$ in an amount greater than or equal to 16.09 mol % to less than or equal to 20.2 mol % $Na_2O$, including subranges. For example, in aspects, the glass composition may include $Na_2O$ in an amount greater than or equal to 16.5 mol % to less than or equal to 20.2 mol % $Na_2O$, greater than or equal to 17.0 mol % to less than or equal to 20.2 mol % $Na_2O$, greater than or equal to 17.5 mol % to less than or equal to 20.2 mol % $Na_2O$, greater than or equal to 18.0 mol % to less than or equal to 20.2 mol % $Na_2O$, greater than or equal to 18.5 mol % to less than or equal to 20.2 mol % $Na_2O$, greater than or equal to 19.0 mol % to less than or equal to 20.2 mol % $Na_2O$, greater than or equal to 16.09 mol % to less than or equal to 20.0 mol % $Na_2O$, greater than or equal to 16.09 mol % to less than or equal to 19.5 mol % $Na_2O$, greater than or equal to 16.09 mol % to less than or equal to 19.0 mol % $Na_2O$, greater than or equal to 16.09 mol % to less than or equal to 18.5 mol % $Na_2O$, greater than or equal to 16.09 mol % to less than or equal to 18.0 mol % $Na_2O$, greater than or equal to 16.09 mol % to less than or equal to 17.5 mol % $Na_2O$, or greater than or equal to 16.09 mol % to less than or equal to 17.0 mol % $Na_2O$.

In aspects, the mol % of $Na_2O$+the mol % of RO−the mol % of $Al_2O_3$ ($Na_2O$ mol %+RO mol %−$Al_2O_3$ mol %) for the glass composition may be greater than or equal to 4 mol %. In aspects, $Na_2O$ mol %+RO mol %−$Al_2O_3$ mol % may be greater than or equal to 4 mol % to less than or equal to 11 mol % (for example, 11 mol %≥($Na_2O$ mol %+RO mol %−$Al_2O_3$ mol %)≥4 mol %), including subranges. In aspects, $Na_2O$ mol %+RO mol %−$Al_2O_3$ mol % may be greater than or equal to 5 mol %, greater than or equal to 6 mol %, greater than or equal to 7 mol %, greater than or equal to 8 mol %, greater than or equal to 9 mol %, or greater than or equal to 10 mol %. In aspects, $Na_2O$ mol %+RO mol %−$Al_2O_3$ mol % may be less than or equal to 11 mol %, less than or equal to 10 mol %, less than or equal to 9 mol %, less than or equal to 8 mol %, less than or equal to 7 mol %, less than or equal to 6 mol %, or less than or equal to 5 mol %. In the above equation, RO mol % equals MgO mol % plus CaO mol %.

Any of the above ranges may be combined with any other range. For example, in aspects, $Na_2O$ mol %+RO mol %−$Al_2O_3$ may be greater than or equal to 4 mol % to less than or equal to 10 mol %, greater than or equal to 4 mol % to less than or equal to 9 mol %, greater than or equal to 4 mol % to less than or equal to 8 mol %, or greater than or equal to 4 mol % to less than or equal to 7 mol %.

The ($Na_2O$ mol %+RO mol %−$Al_2O_3$ mol %) values described above benefit the glass compositions disclosed herein. With the ($Na_2O$ mol %+RO mol %−$Al_2O_3$ mol %) values as described above, the glass compositions exhibit the following advantageous properties. First, tailoring the ($Na_2O$ mol %+RO mol %−$Al_2O_3$ mol %) values as described above improves the meltability of the glass compositions. The ($Na_2O$ mol %+RO mol %−$Al_2O_3$ mol %) values create advantageous thermal properties, for example liquidus temperatures and liquidus viscosities as discussed herein, which increase ease of manufacturing glass articles made from the compositions. If the ($Na_2O$ mol %+RO mol %−$Al_2O_3$ mol %) value is below 4 mol %, the meltability of the glass composition can suffer. Second, tailoring the ($Na_2O$ mol %+RO mol %−$Al_2O_3$ mol %) values as described above ensures an ion-exchanging window that can generate a desirable composition gradient while avoiding significant stress relaxation with a glass article that counteracts compressive stresses imparted by an ion-exchange process. If the value ($Na_2O$ mol %+RO mol %−$Al_2O_3$ mol %) is above 11 mol %, a significant amount of stress relation within a glass article can occur during an ion-exchange process. This stress relaxation reduces the compressive stress, and in particular the peak compressive stress, imparted during an ion-exchange process.

In aspects, the mol % of $Na_2O$+the mol % of RO ($Na_2O$ mol %+RO mol %) for the glass composition may be greater than or equal to 20 mol %. In aspects, $Na_2O$ mol %+RO mol % may be greater than or equal to 20 mol % to less than or equal to 25 mol % (for example, 25 mol %≥($Na_2O$ mol %+RO mol %)≥20 mol %). The ($Na_2O$ mol %+RO mol %) values described above can benefit the glass compositions disclosed herein. With the ($Na_2O$ mol %+RO mol %) values as described above, the glass compositions can exhibit a desirable liquidus temperature, a desirable liquidus viscosity, or both for some manufacturing techniques used to form the compositions into glass articles, such as slot drawing. In addition, the ($Na_2O$ mol %+RO mol %) values as described above can facilitate the formation of a high peak compressive stress during ion-exchange.

In aspects, the mol % of $Al_2O_3$+the mol % of $Na_2O$ ($Al_2O_3$ mol %+$Na_2O$ mol %) for the glass composition may be greater than or equal to 28 mol %. In aspects, $Al_2O_3$ mol %+$Na_2O$ mol % may be greater than or equal to 28 mol % to less than or equal to 37 mol % (for example, 37 mol %≥($Na_2O$ mol %+RO mol %)≥28 mol %), including subranges. For example, in aspects, $Al_2O_3$ mol %+$Na_2O$ mol % may be greater than or equal to 30 mol % to less than or equal to 37 mol %, greater than or equal to 32 mol % to less than or equal to 37 mol %, greater than or equal to 28 mol % to less than or equal to 35 mol %, or greater than or equal to 28 mol % to less than or equal to 33 mol %. The ($Al_2O_3$ mol %+$Na_2O$ mol %) values described above can benefit the glass compositions disclosed herein. With the ($Al_2O_3$ mol %+$Na_2O$ mol %) values as described above, the glass compositions can exhibit a desirable liquidus temperature, a desirable liquidus viscosity, or both for some manufacturing techniques used to form the compositions into glass articles, such as slot drawing.

Glass compositions described herein include MgO. MgO may lower the viscosity of a glass, which enhances the formability and manufacturability of the glass. The inclusion of MgO in a glass composition may also improve the strain point and the Young's modulus of the glass composition as well as the ion-exchange-ability of the glass. However, if too much MgO is added to the glass composition, the density and the CTE of the glass composition may increase to undesirable levels. Further, if too much MgO is added, the liquidus temperature may be too high and the liquidus viscosity may be too low for some manufacturing processes.

In aspects, the glass composition may include MgO in an amount greater than or equal to 1 mol % to less than or equal to 3.88 mol % MgO, including subranges. For example, in aspects, the glass composition may include MgO in an amount greater than or equal to 1.25 mol % to less than or equal to 3.88 mol % MgO, greater than or equal to 1.5 mol % to less than or equal to 3.88 mol % MgO, greater than or equal to 1.75 mol % to less than or equal to 3.88 mol % MgO, greater than or equal to 2.0 mol % to less than or equal to 3.88 mol % MgO, greater than or equal to 2.25 mol % to less than or equal to 3.88 mol % MgO, greater than or equal to 2.5 mol % to less than or equal to 3.88 mol % MgO, greater than or equal to 2.75 mol % to less than or equal to 3.88 mol % MgO, greater than or equal to 3.0 mol % to less than or equal to 3.88 mol % MgO, greater than or equal to 3.25 mol % to less than or equal to 3.88 mol % MgO, greater than or equal to 1 mol % to less than or equal to 3.5 mol % MgO, greater than or equal to 1 mol % to less than or equal to 3.25 mol % MgO, greater than or equal to 1 mol % to less than or equal to 3.0 mol % MgO, greater than or equal to 1 mol % to less than or equal to 2.75 mol % MgO, greater than or equal to 1 mol % to less than or equal to 2.5 mol % MgO, greater than or equal to 1 mol % to less than or equal to 2.25 mol % MgO, greater than or equal to 1 mol % to less than or equal to 2.0 mol % MgO, greater than or equal to 1 mol % to less than or equal to 1.75 mol % MgO, or greater than or equal to 1 mol % to less than or equal to 1.5 mol % MgO.

In aspects, the glass composition may include MgO in an amount greater than or equal to 1.92 mol % to less than or equal to 3.88 mol % MgO, including subranges. For example, in aspects, the glass composition may include MgO in an amount greater than or equal to 2.0 mol % to less than or equal to 3.88 mol % MgO, greater than or equal to 2.2 mol % to less than or equal to 3.88 mol % MgO, greater than or equal to 2.4 mol % to less than or equal to 3.88 mol % MgO, greater than or equal to 2.6 mol % to less than or equal to 3.88 mol % MgO, greater than or equal to 2.8 mol % to less than or equal to 3.88 mol % MgO, greater than or equal to 3.0 mol % to less than or equal to 3.88 mol % MgO, greater than or equal to 3.2 mol % to less than or equal to 3.88 mol % MgO, greater than or equal to 1.92 mol % to less than or equal to 3.6 mol % MgO, greater than or equal to 1.92 mol % to less than or equal to 3.4 mol % MgO, greater than or equal to 1.92 mol % to less than or equal to 3.2 mol % MgO, greater than or equal to 1.92 mol % to less than or equal to 3.0 mol % MgO, greater than or equal to 1.92 mol % to less than or equal to 2.8 mol % MgO, greater than or equal to 1.92 mol % to less than or equal to 2.6 mol % MgO, or greater than or equal to 1.92 mol % to less than or equal to 2.4 mol % MgO.

In aspects, the glass composition may include MgO in an amount greater than or equal to 1 mol % to less than or equal to 4 mol % MgO, including subranges. For example, in aspects, the glass composition may include MgO in an amount greater than or equal to 1.5 mol % to less than or equal to 4 mol % MgO, greater than or equal to 2 mol % to less than or equal to 4 mol % MgO, greater than or equal to 2.5 mol % to less than or equal to 4 mol % MgO, greater than or equal to 1 mol % to less than or equal to 3.5 mol % MgO, greater than or equal to 1 mol % to less than or equal to 3 mol % MgO, or greater than or equal to 1 mol % to less than or equal to 2.5 mol % MgO.

Glass compositions described herein include CaO. CaO may lower the viscosity of a glass, which may enhance the formability, the strain point and the Young's modulus, and may improve the ion-exchange-ability of the glass. However, if too much CaO is added to the glass composition, the density and the CTE of the glass composition may increase to undesirable levels. Further, CaO amounts described herein can help slow an ion-exchange process within the composition, which can enable more precise control of the ion-exchange process. For example, the CaO amounts can enable a more precise control of a DOC.

In aspects, the glass composition may include CaO in an amount greater than or equal to 0.78 mol % to less than or equal to 3 mol % CaO, including subranges. For example, in aspects, the glass composition may include CaO in an amount greater than or equal to 1.0 mol % to less than or equal to 3 mol % CaO, greater than or equal to 1.25 mol % to less than or equal to 3 mol % CaO, greater than or equal to 1.5 mol % to less than or equal to 3 mol % CaO, greater than or equal to 1.75 mol % to less than or equal to 3 mol % CaO, greater than or equal to 2.0 mol % to less than or equal to 3 mol % CaO, greater than or equal to 2.25 mol % to less than or equal to 3 mol % CaO, greater than or equal to 2.5 mol % to less than or equal to 3 mol % CaO, greater than or equal to 0.78 mol % to less than or equal to 2.75 mol % CaO, greater than or equal to 0.78 mol % to less than or equal to 2.5 mol % CaO, greater than or equal to 0.78 mol % to less than or equal to 2.25 mol % CaO, greater than or equal to 0.78 mol % to less than or equal to 2.0 mol % CaO, greater than or equal to 0.78 mol % to less than or equal to 1.75 mol % CaO, greater than or equal to 0.78 mol % to less than or equal to 1.5 mol % CaO, or greater than or equal to 0.78 mol % to less than or equal to 1.25 mol % CaO.

In aspects, the glass composition may include CaO in an amount greater than or equal to 0.78 mol % to less than or equal to 2 mol % CaO, including subranges. For example, in aspects, the glass composition may include CaO in an amount greater than or equal to 0.9 mol % to less than or equal to 2 mol % CaO, greater than or equal to 1.0 mol % to less than or equal to 2 mol % CaO, greater than or equal to 1.1 mol % to less than or equal to 2 mol % CaO, greater than or equal to 1.2 mol % to less than or equal to 2 mol % CaO, greater than or equal to 1.3 mol % to less than or equal to 2 mol % CaO, greater than or equal to 1.4 mol % to less than or equal to 2 mol % CaO, greater than or equal to 1.5 mol % to less than or equal to 2 mol % CaO, greater than or equal to 0.78 mol % to less than or equal to 1.9 mol % CaO, greater than or equal to 0.78 mol % to less than or equal to 1.8 mol % CaO, greater than or equal to 0.78 mol % to less than or equal to 1.7 mol % CaO, greater than or equal to 0.78 mol % to less than or equal to 1.6 mol % CaO, greater than or equal to 0.78 mol % to less than or equal to 1.5 mol % CaO, greater than or equal to 0.78 mol % to less than or equal to 1.4 mol % CaO, greater than or equal to 0.78 mol % to less than or equal to 1.3 mol % CaO, or greater than or equal to 0.78 mol % to less than or equal to 1.2 mol % CaO.

In aspects, the glass composition may include CaO in an amount greater than or equal to 0.78 mol % to less than or equal to 2.52 mol % CaO, including subranges. For example, in aspects, the glass composition may include CaO in an amount greater than or equal to 1.0 mol % to less than or equal to 2.52 mol % CaO, greater than or equal to 1.2 mol % to less than or equal to 2.52 mol % CaO, greater than or equal to 1.4 mol % to less than or equal to 2.52 mol % CaO, greater than or equal to 1.6 mol % to less than or equal to 2.52 mol % CaO, greater than or equal to 1.8 mol % to less than or equal to 2.52 mol % CaO, greater than or equal to 2.0 mol % to less than or equal to 2.52 mol % CaO, greater than or equal to 0.78 mol % to less than or equal to 2.4 mol % CaO, greater than or equal to 0.78 mol % to less than or equal to 2.2 mol % CaO, greater than or equal to 0.78 mol % to less than or equal to 2.0 mol % CaO, greater than or equal to 0.78 mol % to less than or equal to 1.8 mol % CaO, greater than or equal to 0.78 mol % to less than or equal to 1.6 mol % CaO, greater than or equal to 0.78 mol % to less than or equal to 1.4 mol % CaO, or greater than or equal to 0.78 mol % to less than or equal to 1.2 mol % CaO.

In aspects, the glass composition may include CaO in an amount greater than or equal to 0.5 mol % to less than or equal to 3 mol % CaO, including subranges. For example, in aspects, the glass composition may include CaO in an amount greater than or equal to 1 mol % to less than or equal to 3 mol % CaO, greater than or equal to 2 mol % to less than or equal to 3 mol % CaO, or greater than or equal to 0.5 mol % to less than or equal to 2 mol % CaO.

In aspects, the ratio of the mol % for MgO to the mol % of MgO plus the mol % of CaO (MgO mol %/(MgO mol %+CaO mol %)) for the glass composition may be greater than or equal to 0.5. In aspects, MgO mol %/(MgO mol %+CaO mol %) may be greater than or equal to 0.55, greater than or equal to 0.6, greater than or equal to 0.65, greater than or equal to 0.7, greater than or equal to 0.75, or equal to 0.8. In aspects, MgO mol %/(MgO mol %+CaO mol %) may be less than or equal to 0.8, less than or equal to 0.75, less than or equal to 0.7, less than or equal to 0.65, less than or equal to 0.6, less than or equal to 0.55, or equal to 0.5.

In aspects, MgO mol %/(MgO mol %+CaO mol %) may be greater than or equal to 0.5 to less than or equal to 0.8 (for example, 0.8≥(MgO mol %/(MgO mol %+CaO mol %))≥0.5), including all ranges and subranges between the foregoing values. For example, in aspects, MgO mol %/(MgO mol %+CaO mol %) may be greater than or equal to 0.55 to less than or equal to 0.8, greater than or equal to 0.6 to less than or equal to 0.8, greater than or equal to 0.65 to less than or equal to 0.8, greater than or equal to 0.7 to less than or equal to 0.8, greater than or equal to 0.5 to less than or equal to 0.75, greater than or equal to 0.5 to less than or equal to 0.7, greater than or equal to 0.5 to less than or equal to 0.65, or greater than or equal to 0.5 to less than or equal to 0.6.

Glass compositions described herein may be free or substantially free of one or more of: ZnO, SrO, BaO, $B_2O_3$, $P_2O_5$, $Li_2O$, and $K_2O$. In aspects, the glass composition may be free or substantially free of all of: ZnO, SrO, BaO, $B_2O_3$, $P_2O_5$, $Li_2O$, and $K_2O$. Some of these oxides can be expensive and/or in limited supply. The alkali earth metal oxides can undesirably increase Young's modulus and can slow an ion-exchange process. $B_2O_3$, $P_2O_5$, and $K_2O$ can decrease the amount of compressive stress imparted during an ion-exchange process. Glass articles described herein are able to achieve advantageous properties without the need for these oxides. Accordingly, these oxides may be excluded from the composition. As used herein, the term "substantially free" means that the component is not added as a component of the batch material even though the component may be present in the final glass in very small amounts as a contaminant. As a result of the raw materials and/or equipment used to produce a glass composition of the present disclosure, certain impurities or components that are not intentionally added, can be present in the final glass composition. Such materials are present in the glass composition in minor amounts, referred to "tramp materials." A composition that is "substantially free" of a component means that the component was not purposefully added to the composition, but the composition may still comprise the component in tramp or trace amounts. A composition that is "substantially free" of an oxide means that the oxide is present at an amount less than or equal to 0.1 mol %, for example 0 mol % to 0.1 mol %. As used herein, a glass composition that is "entirely free" of a component, is defined as meaning that the component (e.g., oxide) is not present in the composition, even in tramp or trace amounts.

In aspects, the glass composition may optionally include one or more fining agents. In aspects, the fining agents may include, for example, $SnO_2$. In such aspects, $SnO_2$ may be present in the glass composition in an amount of less than or equal to 2 mol %, for example from 0 mol % to 2 mol %, including subranges. For example, in aspects, $SnO_2$ may be present in the glass composition in an amount of greater than or equal to 0.1 mol % to less than or equal to 2 mol %, greater than or equal to 0.1 mol % to less than or equal to 1.5 mol %, greater than or equal to 0.1 mol % to less than or equal to 1 mol %, greater than or equal to 0.1 mol % to less than or equal to 0.5 mol %, or greater than or equal to 0.1 mol % to less than or equal to 0.25 mol %.

Physical properties of the glass compositions disclosed herein, and glass articles made from the glass compositions, are discussed below. These physical properties can be achieved by tailoring the component amounts of the glass composition, as will be discussed in more detail with reference to the examples.

In aspects, the Young's modulus (E) of a glass composition may be greater than or equal to 70 gigapascals (GPa) to less than or equal to 80 GPa, and all ranges and sub-ranges between the foregoing values. For example, in aspects, the Young's modulus (E) of a glass composition may be greater than or equal to 70 gigapascals (GPa) to less than or equal to 79 GPa, greater than or equal to 70 gigapascals (GPa) to less than or equal to 78 GPa, greater than or equal to 70 gigapascals (GPa) to less than or equal to 77 GPa, greater than or equal to 70 gigapascals (GPa) to less than or equal to 76 GPa, greater than or equal to 70 gigapascals (GPa) to less than or equal to 75 GPa, greater than or equal to 70 gigapascals (GPa) to less than or equal to 74 GPa, or greater than or equal to 70 gigapascals (GPa) to less than or equal to 73 GPa.

Unless specified otherwise, the Young's modulus values and Poisson's ratio values disclosed in this disclosure refer to a value as measured by a resonant ultrasonic spectroscopy technique of the general type set forth in ASTM E2001-13, titled "Standard Guide for Resonant Ultrasound Spectroscopy for Defect Detection in Both Metallic and Non-metallic Parts." Also, unless specified otherwise, the Young's modulus and Poisson's ratio of a glass composition or article is measured before the composition or article is subjected to any ion-exchange process, or any other strengthening process. In particular, the Young's modulus and Poisson's ratio of a glass composition or article is measured before the composition or article is exposed to an ion-exchange solution, for example, before being immersed in an ion-exchange solution. A Poisson's ratio value (v) is calculated based on the Young's modulus value (E) and shear modulus value (G) obtained from the ASTM E2001-13 test using the following formula: $E=2G(1+v)$.

In aspects, the liquidus viscosity of the glass composition may be in a range of greater than or equal to 500 kP (kilopoise). In aspects, the liquidus viscosity of the glass composition may be in a range of greater than or equal to 500 kP to less than or equal to 2300 kP, including subranges. For example, in aspects, the liquidus viscosity of the glass composition may be in a range of greater than or equal to 750 kP to less than or equal to 2300 kP, greater than or equal to 1000 kP to less than or equal to 2300 kP, greater than or equal to 1500 kP to less than or equal to 2300 kP, greater than or equal to 500 kP to less than or equal to 2000 kP, greater than or equal to 500 kP to less than or equal to 1750 kP, greater than or equal to 500 kP to less than or equal to 1500 kP, greater than or equal to 500 kP to less than or equal to 1250 kP, or greater than or equal to 500 kP to less than or equal to 1000 kP. In aspects, the liquidus viscosity of the glass composition may be in a range of greater than or equal to 1000 kP to less than or equal to 1500 kP.

In aspects, the glass compositions can have a liquidus temperature of greater than or equal to 500° C. In aspects, the glass compositions can have a liquidus temperature greater than or equal to 500° C. to less than or equal to 1200° C.

As used herein, the term "liquidus viscosity" refers to the viscosity of a molten glass at the liquidus temperature, wherein the liquidus temperature refers to the temperature at which crystals first appear as a molten glass cools down from the melting temperature, or the temperature at which the very last crystals melt away as temperature is increased from room temperature. Unless specified otherwise, a liquidus viscosity value disclosed in this application is determined by the following method. First, the liquidus temperature of the glass is measured in accordance with ASTM C829-81 (2015), titled "Standard Practice for Measurement of Liquidus Temperature of Glass by the Gradient Furnace Method." Next, the viscosity of the glass at the liquidus temperature is measured in accordance with ASTM C965-96 (2012), titled "Standard Practice for Measuring Viscosity of Glass above the Softening Point". Unless specified otherwise, the liquidus viscosity and temperature of a glass composition or article is measured before the composition or article is subjected to any ion-exchange process, or any other strengthening process. In particular, the liquidus viscosity and temperature of a glass composition or article is measured before the composition or article is exposed to an ion-exchange solution, for example, before being immersed in an ion-exchange solution.

From the above compositions, glass articles according to aspects may be formed by any suitable method, for example slot forming, float forming, rolling processes, fusion forming processes, etc. The glass composition and the articles produced therefrom may be characterized by the manner in which it may be formed. For instance, the glass composition may be characterized as float-formable (i.e., formed by a float process), down-drawable and, in particular, fusion-formable or slot-drawable (for example, formed by a down draw process, for example a fusion draw process or a slot draw process).

In aspects, the glass articles described herein may be formed by, for example, a down-draw process. Down-draw processes produce glass articles having a uniform thickness that possess relatively pristine surfaces. Because the average flexural strength of the glass article is controlled by the amount and size of surface flaws, a pristine surface that has had minimal contact has a higher initial strength. In addition, down drawn glass articles have a very flat, smooth surface that can be used in its final application without costly grinding and polishing.

In aspects, the glass articles may be described as fusion-formable (i.e., formable using a fusion draw process). The fusion process uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing glass article. The fusion draw method offers the advantage that, because the two glass films flowing over the channel fuse together, neither of the outside surfaces of the resulting glass article comes in contact with any part of the apparatus. Thus, the surface properties of the fusion drawn glass article are not affected by such contact.

In aspects, the glass articles described herein may be formed by a slot draw process. The slot draw process is distinct from the fusion draw method. In slot draw processes, the molten raw material glass is provided to a drawing tank. The bottom of the drawing tank has an open slot with a nozzle that extends the length of the slot. The molten glass flows through the slot and/or nozzle and is drawn downward as a continuous glass article and into an annealing region.

Drawing processes for forming glass articles, for example, glass sheets, are desirable because they allow a thin glass article to be formed with few defects. It was previously thought that glass compositions were required to have relatively high liquidus viscosities—for example a liquidus viscosity greater than 1000 kP, greater than 1100 kP, or greater than 1200 kP—to be formed by a drawing process, for example, fusion drawing or slot drawing. However, developments in drawing processes may allow glasses with lower liquidus viscosities (for example, a liquidus viscosity as low as 500 kP) to be used in drawing processes.

In aspects, the glass articles described herein may exhibit an amorphous microstructure and may be substantially free of crystals or crystallites. In other words, the glass articles in these aspects exclude glass-ceramic materials. In other aspects, the glass articles described herein may include glass-ceramic materials.

As mentioned above, the glass compositions, and articles made from the glass compositions, can be strengthened by an ion-exchange process. With reference to FIG. 1, a glass article 100 may have one or more regions under compressive stress. For example, glass article 100 may have a first compressive stress region 120 and/or a second compressive stress region 122, extending from exterior surfaces of glass article 100 (e.g., surfaces 110, 112) to a depth of compression (DOC, d1, d2) and a second region (e.g., central region 130) under a tensile stress or CT extending from the DOC into the central or interior region of glass article 100. Ion-exchanged compressive stress regions 120, 122 have a concentration of a metal oxide that is different at two or more points through a thickness (t) of glass article 100.

According to the convention normally used in the art, compression or compressive stress (CS) is expressed as a negative (<0) stress and tension or tensile stress is expressed as a positive (>0) stress. Throughout this description, however, CS is expressed as a positive or absolute value—i.e., as recited herein, CS=|CS|. The CS may have a maximum at the surface of the glass, and vary with distance d from the surface according to a function. Referring again to FIG. 1, a first compressive stress region 120 extends from first surface 110 to a depth $d_1$ and a second compressive stress region 122 extends from second surface 112 to a depth $d_2$. Together, these compressive stress regions 120, 122 define the compression region or CS region of glass article 100.

In aspects, the peak compressive stress of one or more compressive stress regions of the glass article may be greater than or equal to 500 MPa to less than or equal to 1300 megapascals (MPa), including subranges. For example, in aspects, the peak compressive stress of one or more compressive stress regions of the glass article may be greater than or equal to 600 MPa to less than or equal to 1300 MPa, greater than or equal to 700 MPa to less than or equal to 1300 MPa, greater than or equal to 800 MPa to less than or equal to 1300 MPa, greater than or equal to 900 MPa to less than or equal to 1300 MPa, greater than or equal to 1000 MPa to less than or equal to 1300 MPa, greater than or equal to 500 MPa to less than or equal to 1200 MPa, greater than or equal to 500 MPa to less than or equal to 1100 MPa, greater than or equal to 500 MPa to less than or equal to 1000 MPa, greater than or equal to 500 MPa to less than or equal to 900 MPa, or greater than or equal to 500 MPa to less than or equal to 800 MPa.

In aspects, glass articles made from the glass compositions may have a ratio of peak compressive stress value to Young's modulus value (peak compressive stress value/Young's modulus value, CS/E) of greater than or equal to 15. In aspects, the glass article may have a CS/E ratio in a range of greater than or equal to 15 to less than or equal to 18, including sub-ranges. For example, in aspects, the glass articles may have a CS/E ratio greater than or equal to 15.5 to less than or equal to 18, greater than or equal to 16 to less than or equal to 18, greater than or equal to 16.5 to less than or equal to 18, greater than or equal to 17 to less than or equal to 18, greater than or equal to 15 to less than or equal to 17.5, greater than or equal to 15 to less than or equal to 17, greater than or equal to 15 to less than or equal to 16.5, or greater than or equal to 15 to less than or equal to 16.

These CS/E ratios, and CS/E ratio ranges, may be achieved at the peak compressive stress and with the depths of compression described herein. For example, in aspects, a glass article may have a CS/E ratio, or CS/E ratio range, as described above with a peak compressive stress in a range of greater than or equal to 500 MPa to less than or equal to 1300 MPa. As another example, a glass article may have a CS/E ratio, or CS/E ratio range, as described above with a depth of compression in a range of greater than or equal to 5 microns to less than or equal to 30 microns. As another example, a glass article may have a CS/E ratio, or CS/E ratio range, as described above with a depth of compression in a range of greater than or equal to 5 microns to less than or equal to 20 microns. As another example, a glass article may have a CS/E ratio, or CS/E ratio range, as described above with a depth of compression in a range of greater than or equal to 5% to less than or equal to 20% of a thickness of the glass article.

The high peak compressive stresses that may be achieved by ion-exchange provides the capability to bend the glass to a tighter (i.e., smaller) bend radius for a given glass thickness. The high peak compressive stress allows the glass to retain net compression and thus contain surface flaws when the glass is subjected to bending around a tight radius. Near-surface flaws cannot extend to failure if they are contained under this net compression, or are disposed within the effective surface compressive layer.

Figure 2:
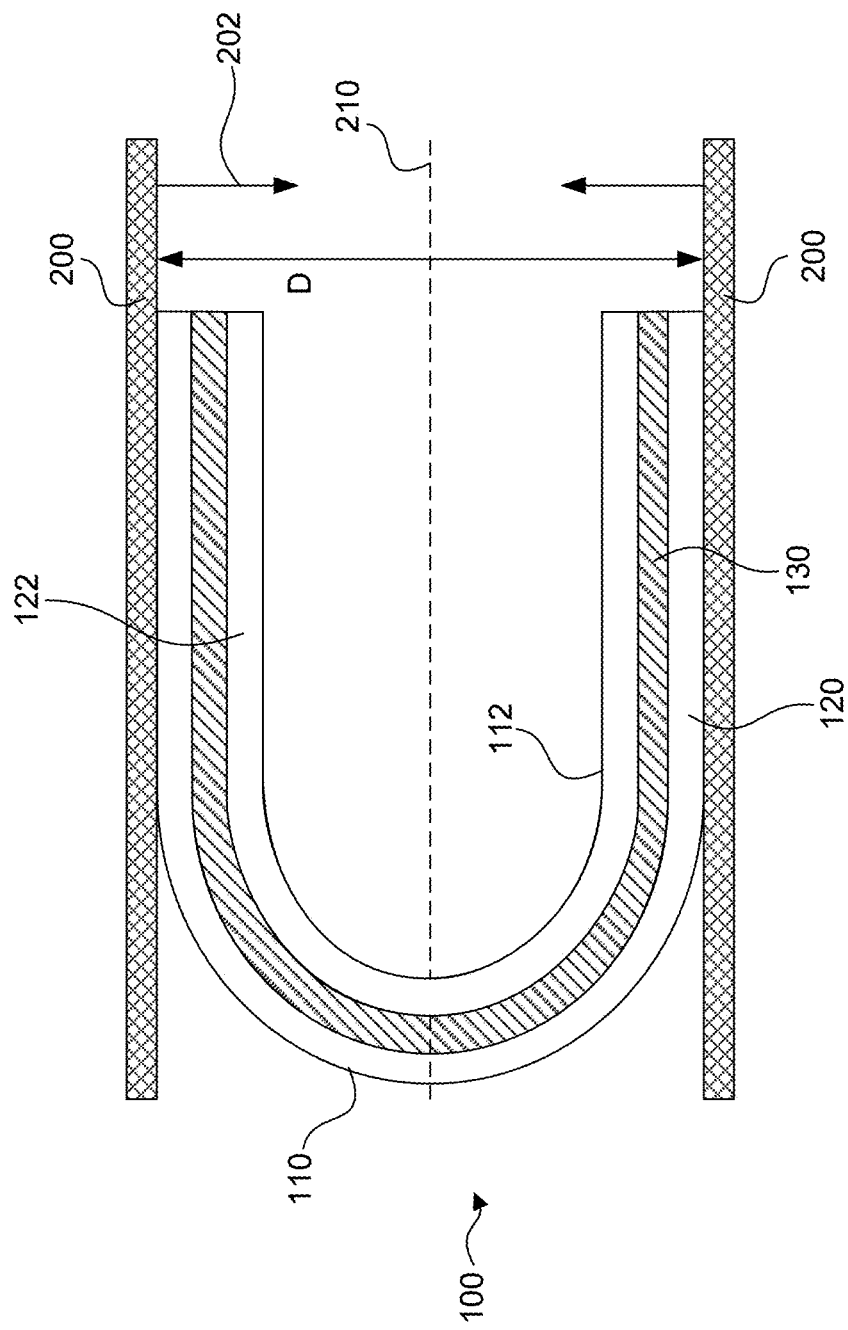
FIG. 2 illustrates a cross-sectional view of a glass article according to aspects upon bending of the glass article.

FIG. 2 illustrates two-point bending of a glass article 100 between two parallel plates 200 using a bend force 202. A bend force 202 is applied using a two-point bend test apparatus where two parallel plates 200 are pressed against glass article 100 during a bending test with a constant force, bend force 202. If needed, fixtures associated with the test apparatus ensure that glass article 100 is bent symmetrically relative to a fold line 210 as the bend force 202 is applied to glass article 100 via plates 200. Plates 200 can be moved together in unison until a particular plate distance (D) is achieved. As used herein, the term "failure" under a bending force refers to breakage, destruction, delamination, crack propagation, permanent deformation, or other mechanism that render an article unsuitable for its intended purpose.

In FIG. 2, surface 110 of glass article 100 is subjected to a tensile stress from the bending, which causes an effective DOC from the surface to decrease from the DOC from surface 110 when the article is unbent, while surface 112 is subjected to additional compressive stress from the bending. The effective DOC from surface 110 increases with increasing plate distance and decreases with decreasing plate distance (when surface 112 of article 100 is bent towards itself as shown in FIG. 2). In other words, the effective DOC is the DOC in an unbent condition minus an effective depth from the tensile stress induced by the bend.

In aspects, glass article 100 avoids failure during a static two-point bend test when held between two parallel plates 200 at a plate distance (D) of 10 millimeters (mm) or less for 240 hours at 60° C. and 93% relative humidity. For example, in aspects, glass article 100 avoids failure during a static two-point bend test when held between two plates for 240 hours at 60° C. and 93% relative humidity to a plate distance (D) of 10 mm to 1 mm. The plate distance (D) may be for example, 10 mm, 9 mm, 8 mm, 7 mm, 6 mm, 5 mm, 4 mm, 3 mm, 2 mm, or 1 mm.

The compressive stress of both regions 120 and 122 is balanced by stored tension in the central region 130 of glass article 100. Unless specified otherwise, CT values are reported as maximum CT values. DOC may be measured by a surface stress meter or a scattered light polariscope (SCALP) depending on the ion exchange treatment and the thickness of the article being measured. Where the stress in the substrate is generated by exchanging potassium ions into the substrate, a surface stress meter, for example, the FSM-6000 (Orihara Industrial Co., Ltd., Japan), is used to measure depth of compression. Where the stress is generated by exchanging sodium ions into the substrate, and the article being measured is thicker than about 400 microns, SCALP is used to measure the depth of compression and maximum central tension (CT). Where the stress in the substrate is generated by exchanging both potassium and sodium ions into the glass, and the article being measured is thicker than about 400 microns, the depth of compression and CT are measured by SCALP. Without wishing to be bound by theory, the exchange depth of sodium may indicate the depth of compression while the exchange depth of potassium ions may indicate a change in the magnitude of the compressive stress (but not necessarily the change in stress from compressive to tensile). As used herein, "depth of layer" means the depth that the ions have exchanged into the substrate (e.g., sodium, potassium). Through the disclosure, when the maximum central tension cannot be measured directly by SCALP (as when the article being measured is thinner than about 400 microns) the maximum central tension can be approximated by product of a maximum compressive stress and a depth of compression divided by the difference between the thickness of the substrate and twice the depth of compression, wherein the compressive stress and depth of compression are measured by FSM.

When the substrate thickness is greater than about 400 microns, the refracted near-field (RNF) method may also be used to derive a graphical representation of the stress profile. When the RNF method is utilized to derive a graphical representation of the stress profile, the maximum CT value provided by SCALP is utilized in the RNF method. In particular, the stress profile measured by RNF is force balanced and calibrated to the maximum CT value provided by a SCALP measurement. The RNF method is described in U.S. Pat. No. 8,854,623, entitled "Systems and methods for measuring a profile characteristic of a glass sample", which is incorporated herein by reference in its entirety. In particular, the RNF method includes placing the glass article adjacent to a reference block, generating a polarization-switched light beam that is switched between orthogonal polarizations at a rate of from 1 Hz to 50 Hz, measuring an amount of power in the polarization-switched light beam and generating a polarization-switched reference signal, wherein the measured amounts of power in each of the orthogonal polarizations are within 50% of each other. The method further includes transmitting the polarization-switched light beam through the glass sample and reference block for different depths into the glass sample, then relaying the transmitted polarization-switched light beam to a signal photodetector using a relay optical system, with the signal photodetector generating a polarization-switched detector signal. The method also includes dividing the detector signal by the reference signal to form a normalized detector signal and determining the profile characteristic of the glass sample from the normalized detector signal.

When a SCALP measurement is performed, it is done using SCALP polariscope (e.g., SCALP-04 or SCALP-05), available from GlassStress Ltd., Talinn, Estonia. The precise sample speed SS and exposure times $t_E$ to reduce the measurement noise in the polarimeter to an acceptable level when measuring a sample to characterize at least one stress-related characteristic depends on a number of factors. These factors include the characteristics of the image sensing device (e.g., the gain, image capture rate (frames/second), pixel size, internal pixel average techniques, etc.), as well as the nature of the no-stress-related (NSR) scattering feature(s), the intensity of the input light beam, the number of polarization states used, etc. Other factors include the measurement wavelength of the light beam from the laser source and the intensity of the scattered light beam. Example measurement wavelengths can include 640 nanometers (nm), 518 nm and 405 nm. Example exposure times can range from 0.05 millisecond to 100 milliseconds. Example frame rates can range from 10 to 200 frames per second. Example calculations of the optical retardation can utilize from two to two-hundred frames over a measurement time $t_M$ of from 0.1 seconds to 10 seconds.

In aspects, the glass article may have a maximum CT from greater than or equal to 20 MPa to less than or equal to 400 megapascals (MPa), for example from greater than or equal to 50 MPa to less than or equal to 350 MPa, from greater than or equal to 75 MPa to less than or equal to 300 MPa, from greater than or equal to 100 MPa to less than or equal to 250 MPa, or from greater than or equal to 150 MPa to less than or equal to 200 MPa, and all ranges and sub-ranges between the foregoing values having any two of the above-listed values as endpoints, including the endpoints. For example, in aspects, the maximum CT may be in a range of greater than or equal to 20 MPa to less than or equal to 400 MPa, greater than or equal to 50 MPa to less than or equal to 350 MPa, greater than or equal to 75 MPa to less than or equal to 300 MPa, greater than or equal to 100 MPa to less than or equal to 250 MPa, or greater than or equal to 150 MPa to less than or equal to 200 MPa, or within an range having any two of these values as endpoints, inclusive of the endpoints.

In aspects, the DOC of region 120 and/or region 122 may be in a range of greater than or equal to 5 microns to less than or equal to 50 microns, including subranges. For example, the DOC may be greater than or equal to 10 microns to less than or equal to 50 microns, greater than or equal to 15 microns to less than or equal to 50 microns, greater than or equal to 20 microns to less than or equal to 50 microns, greater than or equal to 25 microns to less than or equal to 50 microns, greater than or equal to 30 microns to less than or equal to 50 microns, greater than or equal to 35 microns to less than or equal to 50 microns, greater than or equal to 40 microns to less than or equal to 50 microns, greater than or equal to 5 microns to less than or equal to 45 microns, greater than or equal to 5 microns to less than or equal to 40 microns, greater than or equal to 5 microns to less than or equal to 35 microns, greater than or equal to 5 microns to less than or equal to 30 microns, greater than or equal to 5 microns to less than or equal to 25 microns, greater than or equal to 5 microns to less than or equal to 20 microns, or greater than or equal to 5 microns to less than or equal to 15 microns. In aspects, the DOC may be in a range of greater than or equal to 5 microns to less than or equal to 30 microns. In aspects, the DOC may be in a range of greater than or equal to 5 microns to less than or equal to 20 microns.

In aspects, DOC may be reported as a portion of the thickness (t) of the glass article 100. For example, glass articles may have a depth of compression (DOC) from greater than or equal to 5% (0.05t) of the thickness of the glass article to less than or equal to 20% (0.20t) of the thickness of the glass article, including subranges. For example, in aspects, the DOC may be greater than or equal to 10% to less than or equal to 20% of the thickness of the glass article, greater than or equal to 15% to less than or equal to 20% of the thickness of the glass article, greater than or equal to 5% to less than or equal to 15% of the thickness of the glass article, or greater than or equal to 5% to less than or equal to 10% of the thickness of the glass article.

Thickness (t) of glass article 100 is measured between surface 110 and surface 112. In aspects, the thickness of glass article 100 may be less than or equal to 4 millimeters (mm). In aspects, the thickness of glass article 100 may be in a range of greater than or equal to 15 microns to less than or equal to 4 mm, including subranges. For example, in aspects, the thickness of glass article 100 may be greater than or equal to 20 microns to less than or equal to 4 mm, greater than or equal to 30 microns to less than or equal to 4 mm, greater than or equal to 40 microns to less than or equal to 4 mm, greater than or equal to 50 microns to less than or equal to 4 mm, greater than or equal to 60 microns to less than or equal to 4 mm, greater than or equal to 70 microns to less than or equal to 4 mm, greater than or equal to 80 microns to less than or equal to 4 mm, greater than or equal to 90 microns to less than or equal to 4 mm, greater than or equal to 1 mm to less than or equal to 4 mm, greater than or equal to 15 microns to less than or equal to 3 mm, greater than or equal to 15 microns to less than or equal to 2 mm, greater than or equal to 15 microns to less than or equal to 1 mm, greater than or equal to 15 microns to less than or equal to 500 microns, greater than or equal to 15 microns to less than or equal to 400 microns, greater than or equal to 15 microns to less than or equal to 300 microns, greater than or equal to 15 microns to less than or equal to 200 microns, or greater than or equal to 15 microns to less than or equal to 100 microns.

Compressive stress layers may be formed in the glass article by exposing the glass article to an ion-exchange solution. In aspects, the ion-exchange solution may include a molten potassium salt. In aspects, the ion-exchange solution may include greater than or equal to 50 wt % potassium salt, greater than or equal to 60 wt % potassium salt, greater than or equal to 70 wt % potassium salt, greater than or equal to 80 wt % potassium salt, greater than or equal to 90 wt % potassium salt, or 100 wt % potassium salt. For example, in aspects, the ion-exchange solution may include greater than or equal to 50 wt % to less than or equal to 100 wt % potassium salt, greater than or equal to 60 wt % to less than or equal to 100 wt % potassium salt, greater than or equal to 70 wt % to less than or equal to 100 wt % potassium salt, greater than or equal to 80 wt % to less than or equal to 100 wt % potassium salt, or greater than or equal to 90 wt % to less than or equal to 100 wt % potassium salt. In aspects, the potassium salt may be potassium nitrate ($KNO_3$). In aspects, all or a portion of the remaining weight percent in an ion-exchange solutions may be a molten nitrate salt, for example, sodium nitrate ($NaNO_3$).

The glass article may be exposed to the ion-exchange solution by immersing a glass article made from the glass composition into a bath of the ion-exchange solution, spraying the ion-exchange solution onto a glass article made from the glass composition, or otherwise physically applying the ion-exchange solution to the glass article. Upon exposure to the glass article, the ion-exchange solution may, according to aspects, be at a temperature from greater than or equal to 350° C. to less than or equal to 480° C., including subranges. For example, in aspects, the temperature may be greater than or equal to 360° C. to less than or equal to 470° C., greater than or equal to 370° C. to less than or equal to 460° C., greater than or equal to 380° C. to less than or equal to 450° C., greater than or equal to 390° C. to less than or equal to 440° C., greater than or equal to 400° C. to less than or equal to 430° C., or greater than or equal to 410° C. to less than or equal to 420° C.

In aspects, the glass article may be exposed to the ion-exchange solution for a duration from greater than or equal to 5 minutes to less than or equal to 24 hours, including subranges. For example, in aspects, the duration may be from greater than or equal to 5 minutes to less than or equal to 20 hours, from greater than or equal to 5 minutes to less than or equal to 16 hours, from greater than or equal to 5 minutes to less than or equal to 12 hours, from greater than or equal to 5 minutes to less than or equal to 6 hours, from greater than or equal to 5 minutes to less than or equal to 2 hours, from greater than or equal to 5 minutes to less than or equal to 1 hour, or from greater than or equal to 5 minutes to less than or equal to 30 minutes.

After an ion-exchange process is performed, it should be understood that a composition at the surface of a glass article may be different than the composition of the as-formed glass article (for example, the glass article before it undergoes an ion-exchange process). This results from one type of alkali metal ion in the as-formed glass, for example, for example Na+, being replaced with larger alkali metal ions, for example K+. However, the glass composition at or near the center of the depth of the glass article will, in aspects, still have the composition of the as-formed glass article. Unless specified otherwise, glass compositions disclosed in this application are compositions of the glass article near the center of the depth of the article where the composition is unaffected (or is least affected) by an ion-exchange process, i.e., the composition of the as-formed glass article.

Figure 3B:
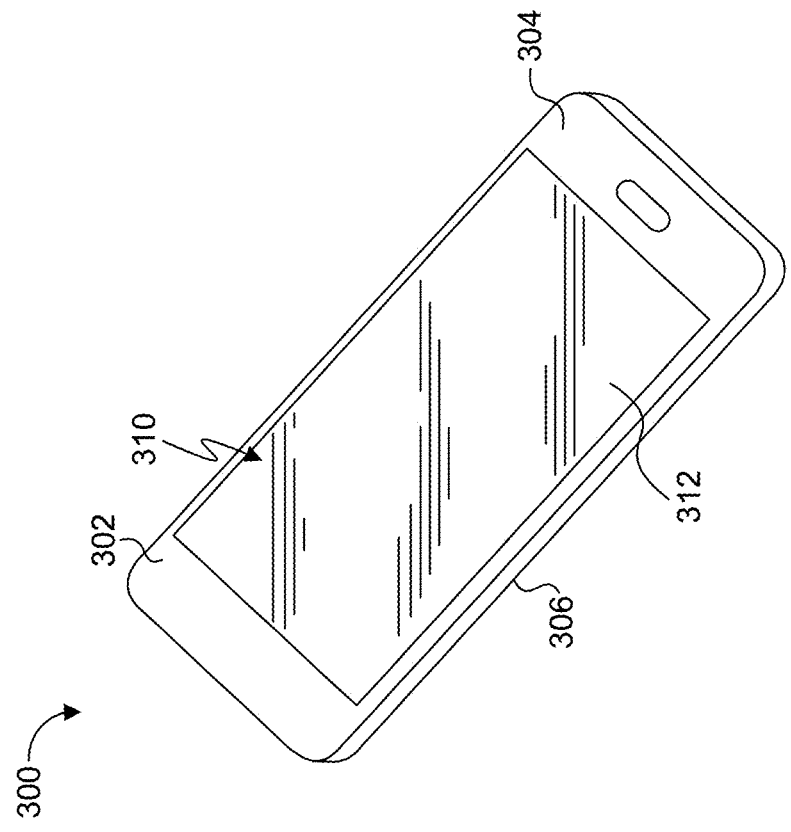
FIG. 3B is a perspective view of the exemplary electronic device of FIG. 3A.
Figure 3A:
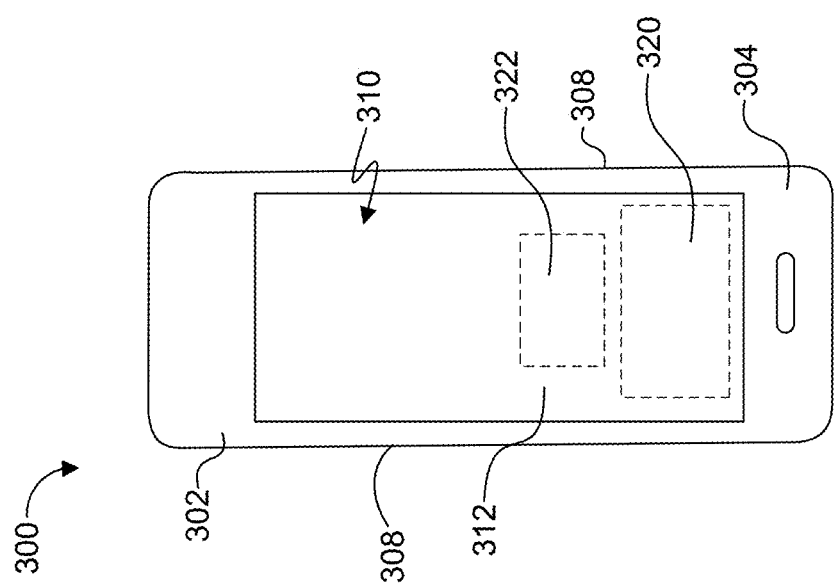
FIG. 3A is a plan view of an exemplary electronic device incorporating a glass article according to any of the glass articles disclosed herein.

The glass articles disclosed herein may be incorporated into another article for example an article with a display (or display articles) (e.g., consumer electronics, including mobile phones, watches, tablets, computers, navigation systems, and the like), architectural articles, transportation articles (e.g., automobiles, trains, aircraft, sea craft, etc.), appliance articles, or any article that may benefit from some transparency, scratch-resistance, abrasion resistance or a combination thereof. An exemplary article incorporating any of the glass articles disclosed herein is shown in FIGS. 3A and 3B. Specifically, FIGS. 3A and 3B show a consumer electronic product 300 including a housing 302 having a front surface 304, a back surface 306, and side surfaces 308. Electrical components that are at least partially inside or entirely within the housing may include at least a controller 320, a memory 322, and a display 310 at or adjacent to front surface 306 of housing 302. Display 310 may be, for example, a light emitting diode (LED) display or an organic light emitting diode (OLED) display.

A cover substrate 312 may be disposed at or over front surface 304 of housing 302 such that it is disposed over display 310. Cover substrate 312 may include any of the glass articles disclosed herein and may be referred to as a "cover glass." Cover substrate 312 may serve to protect display 310 and other components of consumer electronic product 300 (e.g., controller 320 and memory 322) from damage. In aspects, cover substrate 312 may be bonded to display 310 with an adhesive. In aspects, cover substrate 312 may define all or a portion of front surface 304 of housing 302. In aspects, cover substrate 312 may define front surface 304 of housing 302 and all or a portion of side surfaces 308 of housing 302. In aspects, consumer electronic product 300 may include a cover substrate defining all or a portion of back surface 306 of housing 302.

EXAMPLES

Aspects will be further clarified by the following examples. It should be understood that these examples are not limiting to aspects described above.

Glass compositions made of the oxides listed in Tables 2A-2H below were prepared by conventional glass forming methods. Compositions 1-50 (C1-C50) in Tables 2A-2H are glass compositions according to aspects of the present application. In Tables 2A-2H, all oxide components are in mol %.

Tables 3A-3J list material properties of Compositions 1-50 (C1-C50) in Tables 2A-2H. The Young's modulus (E) values reported in Tables 3A-3J were measured according to the methods disclosed in this specification. The shear modulus values were measured by a resonant ultrasonic spectroscopy technique of the general type set forth in ASTM E2001-13, titled "Standard Guide for Resonant Ultrasound Spectroscopy for Defect Detection in Both Metallic and Non-metallic Parts."

Additional material properties listed in Tables 3A-3J include: density, where the density values were determined using the buoyancy method of ASTM C693-93(2013); low temperature (in a range of 0° C. to 300° C.) CTE measured in part per million (ppm) per degree Celsius (ppm/° C.); strain, anneal and softening points, where the strain points were determined using the beam bending viscosity method of ASTM C598-93(2013), annealing points were determined using the fiber elongation method of ASTM C336-71(2015), and softening points were determined using the fiber elongation method of ASTM C338-93(2013); $10^{11}$ Poise, liquidus viscosities, where the liquidus viscosity is determined as discussed herein; and stress optical coefficient (SOC), which is related to the birefringence of the glass. Unless specified otherwise, SOC is measured according to Procedure C (Glass Disc Method) described in ASTM standard C770-16, entitled "Standard Test Method for Measurement of Glass Stress-Optical Coefficient," the contents of which are incorporated herein by reference in their entirety. Unless specified otherwise, the properties listed in Tables 3A-3J were measured before the composition or article was subjected to any ion-exchange process, or any other strengthening process. The CTE values reported in Tables 3A-3J where measured using a fiber elongation technique. A dilatometer was set up according to ASTM E228 ("Standard Test Method for Linear Thermal Expansion of Solid Materials With a Push-Rod Dilatometer"). For the fiber elongation test, a fiber sample of a particular composition mounted in the dilatometer was inserted into a 0° C. ice bath and then a 300° C. isothermal furnace to determine the average linear coefficient of thermal expansion over that temperature range. The fiber samples were prepared by flameworking.

Tables 4A-4G include ion-exchange conditions and properties for Compositions 1-48 (C1-C48) of Tables 2A-2G. For the ion-exchange processes reported in Tables 4A-4G, samples of each composition were immersed in a molten salt bath composed of 100 wt % $KNO_3$. Each sample had a length of 1 inch, a width of 1 inch, and a thickness of 0.8 mm. Composition A (CA) in Tables 4A-4G is a comparative composition composed of: 68.95 mol % $SiO_2$, 10.27 mol % $Al_2O_3$, 5.36 MgO, 0.06 mol % CaO, 15.20 $Na_2O$, and 0.17 mol % $SnO_2$.

Figure 5:
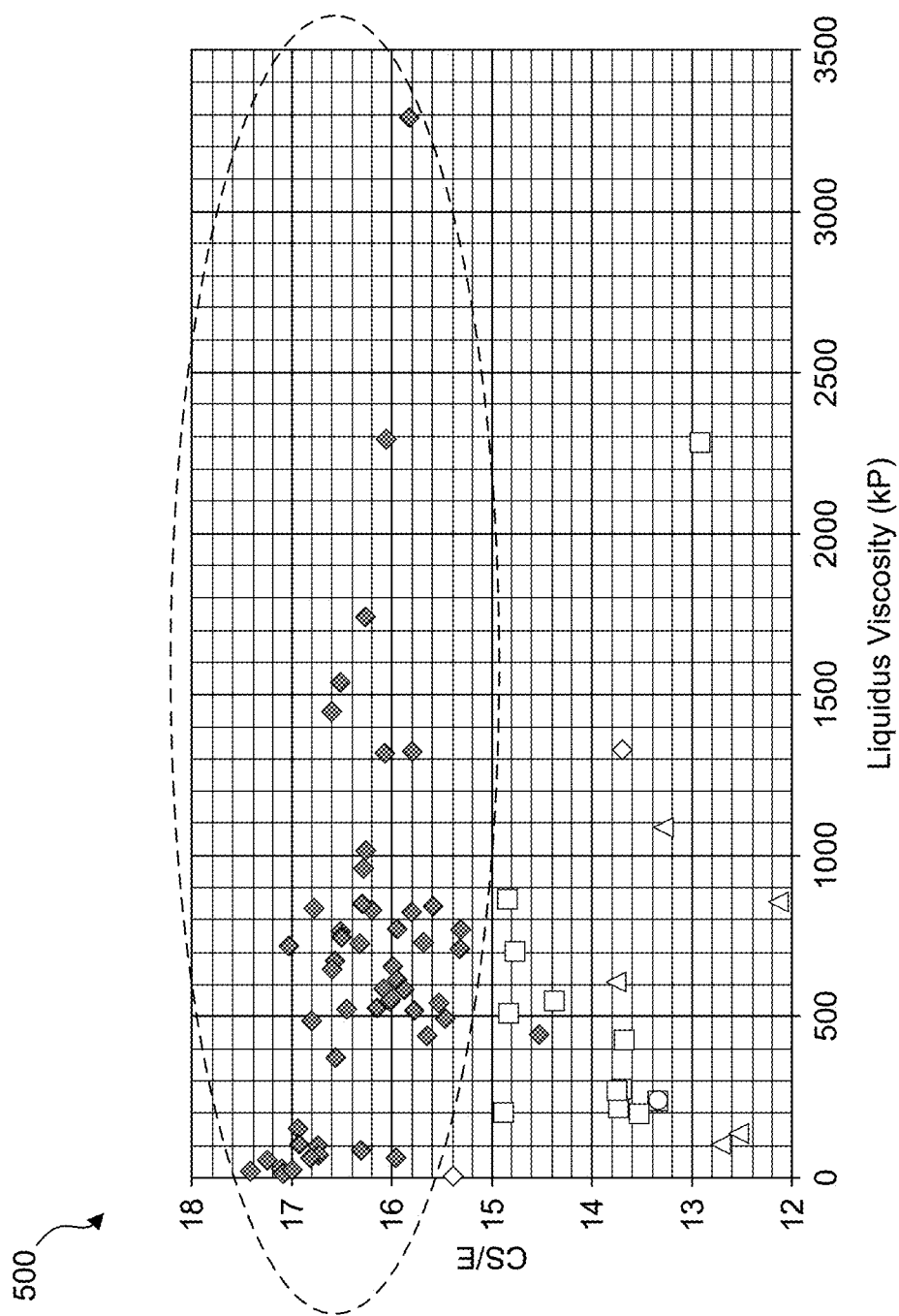
FIG. 5 is a graph a graph of CS/E ratio versus liquid viscosity for various exemplary ion-exchanged glass compositions.

As shown in Tables 4A-4G, all of Compositions 1-48 (C1-C48) achieved a CS/E ratio of at least 15 with various DOCs. And with the exception of C30-C36, which were not ion-exchanged for more than 30 minutes, each composition achieved a CS/E ratio of at least 15 with a DOC of about 15 microns or more. Graph 500 in FIG. 5 is a plot of the CS/E ratio with a DOC of about 20 microns versus the liquidus viscosity for various ion-exchanged glass compositions. The gray diamonds in graph 500 represent various compositions in Tables 2A-2H with a DOC value in the range of 20±5 microns taken from the DOC values reported in Tables 4A-4F. Graph 500 shows that a majority of the compositions had a CS/E ratio of at least 15 and a liquidus viscosity above 500° C.

TABLE 2A

|  | C1 | C2 | C3 | C4 | C5 | C6 | C7 | C8 | C9 |
|---|---|---|---|---|---|---|---|---|---|
| $SiO_2$ | 63.26 | 63.17 | 63.26 | 64.57 | 64.31 | 64.10 | 65.18 | 65.44 | 64.74 |
| $Al_2O_3$ | 15.92 | 15.93 | 15.96 | 15.01 | 14.96 | 14.97 | 13.95 | 14.01 | 13.99 |
| MgO | 2.93 | 3.34 | 3.71 | 2.89 | 3.32 | 3.75 | 2.94 | 3.28 | 3.84 |
| CaO | 1.22 | 1.02 | 0.81 | 1.18 | 1.01 | 0.81 | 1.24 | 0.99 | 0.82 |
| $Na_2O$ | 16.50 | 16.37 | 16.09 | 16.20 | 16.23 | 16.20 | 16.53 | 16.11 | 16.45 |
| $K_2O$ | 0.01 | 0.01 | 0.01 | 0.01 | 0.01 | 0.01 | 0.01 | 0.01 | 0.01 |
| $SnO_2$ | 0.16 | 0.15 | 0.15 | 0.15 | 0.15 | 0.15 | 0.15 | 0.15 | 0.15 |
| Sum | 100.00 | 100.00 | 100.00 | 100.00 | 100.00 | 100.00 | 100.00 | 100.00 | 100.00 |

TABLE 2B

|  | C10 | C11 | C12 | C13 | C14 | C15 |
|---|---|---|---|---|---|---|
| $SiO_2$ | 60.06 | 62.12 | 64.03 | 60.18 | 62.09 | 64.09 |
| $Al_2O_3$ | 15.89 | 15.07 | 14.29 | 16.40 | 15.60 | 14.80 |
| MgO | 2.92 | 2.91 | 2.90 | 1.92 | 1.93 | 1.92 |
| CaO | 0.98 | 0.97 | 0.98 | 1.98 | 1.98 | 1.98 |
| $Na_2O$ | 19.98 | 18.76 | 17.63 | 19.34 | 18.24 | 17.03 |
| $K_2O$ | 0.01 | 0.01 | 0.01 | 0.01 | 0.01 | 0.01 |
| $SnO_2$ | 0.16 | 0.16 | 0.16 | 0.15 | 0.16 | 0.15 |
| Sum | 100.00 | 100.00 | 100.00 | 100.00 | 100.00 | 100.00 |

TABLE 2C

|  | C16 | C17 | C18 | C19 | C20 | C21 |
|---|---|---|---|---|---|---|
| $SiO_2$ | 59.69 | 61.54 | 64.12 | 60.18 | 61.99 | 64.02 |
| $Al_2O_3$ | 15.47 | 14.51 | 13.85 | 15.73 | 14.93 | 14.11 |
| MgO | 3.21 | 3.11 | 3.14 | 2.65 | 2.67 | 2.67 |
| CaO | 1.27 | 1.22 | 1.23 | 1.73 | 1.74 | 1.74 |
| $Na_2O$ | 20.20 | 19.45 | 17.48 | 19.53 | 18.50 | 17.29 |
| $K_2O$ | 0.01 | 0.01 | 0.01 | 0.01 | 0.01 | 0.01 |
| $SnO_2$ | 0.16 | 0.16 | 0.16 | 0.16 | 0.15 | 0.16 |
| Sum | 100.00 | 100.00 | 100.00 | 100.00 | 100.00 | 100.00 |

TABLE 2D

|  | C22 | C23 | C24 | C25 | C26 | C27 |
|---|---|---|---|---|---|---|
| $SiO_2$ | 60.27 | 62.14 | 64.06 | 60.31 | 62.02 | 64.07 |
| $Al_2O_3$ | 14.74 | 13.95 | 13.14 | 15.25 | 14.48 | 13.66 |
| MgO | 3.88 | 3.88 | 3.88 | 2.88 | 2.92 | 2.91 |
| CaO | 0.97 | 0.98 | 0.98 | 1.96 | 1.99 | 1.98 |
| $Na_2O$ | 19.97 | 18.88 | 17.77 | 19.43 | 18.41 | 17.21 |
| $K_2O$ | 0.01 | 0.01 | 0.01 | 0.01 | 0.01 | 0.01 |
| $SnO_2$ | 0.15 | 0.15 | 0.15 | 0.15 | 0.16 | 0.16 |
| Sum | 100.00 | 100.00 | 100.00 | 100.00 | 100.00 | 100.00 |

TABLE 2E

|  | C28 | C29 | C30 | C31 | C32 | C33 | C34 | C35 | C36 |
|---|---|---|---|---|---|---|---|---|---|
| $SiO_2$ | 64.26 | 64.55 | 64.40 | 63.92 | 64.12 | 64.58 | 63.74 | 64.28 | 64.09 |
| $Al_2O_3$ | 13.33 | 13.04 | 12.78 | 13.38 | 13.06 | 12.80 | 13.36 | 13.09 | 12.80 |
| MgO | 2.90 | 2.90 | 2.96 | 2.87 | 2.88 | 2.88 | 2.94 | 2.88 | 2.93 |
| CaO | 2.01 | 2.02 | 2.05 | 2.50 | 2.52 | 2.51 | 2.05 | 2.00 | 2.03 |
| $Na_2O$ | 17.32 | 17.32 | 17.64 | 17.16 | 17.24 | 17.05 | 17.73 | 17.58 | 17.97 |
| $K_2O$ | 0.01 | 0.01 | 0.01 | 0.01 | 0.01 | 0.01 | 0.01 | 0.01 | 0.01 |
| $SnO_2$ | 0.16 | 0.16 | 0.16 | 0.16 | 0.16 | 0.16 | 0.16 | 0.16 | 0.16 |
| Sum | 100.00 | 100.00 | 100.00 | 100.00 | 100.00 | 100.00 | 100.00 | 100.00 | 100.00 |

TABLE 2F

|  | C37 | C38 | C39 | C40 | C41 | C42 |
|---|---|---|---|---|---|---|
| $SiO_2$ | 65.17 | 64.70 | 64.66 | 65.21 | 64.95 | 64.67 |
| $Al_2O_3$ | 14.03 | 14.05 | 14.02 | 14.01 | 14.00 | 14.02 |
| MgO | 2.45 | 2.46 | 2.45 | 1.94 | 1.96 | 1.96 |
| CaO | 1.69 | 1.71 | 1.68 | 2.18 | 2.19 | 2.21 |
| $Na_2O$ | 16.49 | 16.91 | 17.01 | 16.49 | 16.73 | 16.97 |
| $K_2O$ | 0.01 | 0.01 | 0.01 | 0.01 | 0.01 | 0.01 |
| $SnO_2$ | 0.16 | 0.16 | 0.16 | 0.16 | 0.16 | 0.16 |
| Sum | 100.00 | 100.00 | 100.00 | 100.00 | 100.00 | 100.00 |

TABLE 2G

|  | C43 | C44 | C45 | C46 | C47 | C48 |
|---|---|---|---|---|---|---|
| $SiO_2$ | 65.03 | 65.10 | 65.13 | 64.63 | 64.68 | 64.64 |
| $Al_2O_3$ | 14.00 | 13.98 | 14.00 | 14.01 | 13.99 | 13.99 |
| MgO | 2.91 | 3.29 | 3.67 | 3.36 | 3.77 | 3.68 |
| CaO | 1.18 | 0.98 | 0.78 | 1.18 | 0.98 | 1.28 |
| $Na_2O$ | 16.71 | 16.47 | 16.24 | 16.64 | 16.43 | 16.24 |
| $K_2O$ | 0.01 | 0.01 | 0.01 | 0.01 | 0.01 | 0.01 |
| $SnO_2$ | 0.16 | 0.16 | 0.16 | 0.16 | 0.15 | 0.16 |
| Sum | 100.00 | 100.00 | 100.00 | 100.00 | 100.00 | 100.00 |

TABLE 2H

|  | C49 | C50 |
|---|---|---|
| $SiO_2$ | 65.01 | 65.17 |
| $Al_2O_3$ | 13.99 | 13.99 |
| MgO | 3.41 | 2.48 |
| CaO | 0.97 | 1.68 |
| $Na_2O$ | 16.45 | 16.50 |
| $K_2O$ | 0.01 | 0.01 |
| $SnO_2$ | 0.16 | 0.16 |
| Sum | 100.00 | 100.00 |

TABLE 3A

| Properties | C1 | C2 | C3 | C4 |
|---|---|---|---|---|
| Density | 2.466 | 2.466 | 2.464 | 2.460 |
| CTE (0-300° C.) ppm/° C. | 84.50 | 83.30 | 81.70 | 83.90 |
| Stain Point (fiber Elongation) | 649.0 | 649.0 | 654.0 | 640.0 |
| Annealing Point (fiber Elongation) | 703.0 | 704.0 | 708.0 | 694.0 |
| Softening Point (fiber Elongation) | 954.6 | 959.0 | 962.6 | 947.9 |
| 10^11 Poises | 790 | 795 | 805 | 780 |
| Young's modulus (GPa) | 73.6 | 73.8 | 74.0 | 73.0 |
| Shear modulus (GPa) | 30.4 | 30.5 | 30.5 | 30.2 |
| Poisson's ratio | 0.212 | 0.211 | 0.212 | 0.210 |
| RI @ 589.3 | 1.5075 | 1.5072 | 1.5064 | 1.5063 |
| SOC (546.1 nm) single PT | 2.972 | 2.983 | 2.982 | 2.985 |
| VFT parameters from HTV |  |  |  |  |
| A | −4.492 | −4.392 | −4.272 | −4.106 |
| B | 11267.6 | 10933.0 | 10590.5 | 10526.8 |
| To | 6.1 | 29.8 | 56.6 | 32.2 |
| Liquidus (gradient boat) |  |  |  |  |
| duration (hours) | 24 | 24 | 24 | 24 |
| Air (° C.) | 1105 | 1090 | 1130 | 1060 |
| internal (° C.) | 1095 | 1090 | 1120 | 1055 |
| Pt (° C.) | 1100 | 1090 | 1120 | 1045 |

TABLE 3A-continued

| Properties | C1 | C2 | C3 | C4 |
|---|---|---|---|---|
| primary phase | Nepheline | Nepheline | Forsterite | Nepheline |
| 2ndry phase | — | Forsterite up to 1075° C. | Nepheline up to 1065° C. | — |
| liquidus viscosity (Internal) kP | 718 | 833 | 487 | 1536 |

TABLE 3B

| Properties | C5 | C6 | C7 | C8 | C9 |
|---|---|---|---|---|---|
| Density | 2.460 | 2.461 | 2.459 | 2.456 | 2.459 |
| CTE (0-300° C.) ppm/° C. | 83.90 | 83.30 | 85.10 | 84.00 | 84.80 |
| Stain Point (fiber Elongation) | 640.0 | 643.0 | 617.0 | 627.0 | 622.0 |
| Annealing Point (fiber Elongation) | 694.0 | 697.0 | 670.0 | 681.0 | 675.0 |
| Softening Point (fiber Elongation) | 944.9 | 945.5 | 918.2 | 934.4 | 920.9 |
| 10^11 Poises | 780 | 785 | 755 | 765 | 765 |
| Young's modulus (GPa) | 73.1 | 73.3 | 72.5 | 72.7 | 72.8 |
| Shear modulus (GPa) | 30.2 | 30.3 | 30.0 | 30.0 | 30.1 |
| Poisson's ratio | 0.210 | 0.211 | 0.210 | 0.211 | 0.211 |
| RI @ 589.3 | 1.5063 | 1.5062 | 1.5066 | 1.5055 | 1.5062 |
| SOC (546.1 nm) single PT | 2.982 | 2.989 | 2.986 | 3.012 | 2.986 |
| VFT parameters from HTV | | | | | |
| A | −4.013 | −3.916 | −3.772 | −3.671 | −3.596 |
| B | 10194.4 | 9865.2 | 9810.1 | 9550.4 | 9208.4 |
| To | 52.9 | 75.7 | 46.9 | 72.6 | 91.0 |
| Liquidus (gradient boat) | | | | | |
| duration (hours) | 24 | 24 | 24 | 24 | 24 |
| Air (° C.) | 1055 | 1090 | 1010 | 1010 | 1050 |
| internal (° C.) | 1055 | 1090 | 1015 | 1010 | 1050 |
| Pt (° C.) | 1050 | 1080 | 1020 | 1000 | 1030 |
| primary phase | Forsterite | Forsterite | Nepheline | Nepheline | Forsterite |
| 2ndry phase | Nepheline up to 1050° C. | Nepheline up to 1025° C. | — | — | Nepheline up to 1015° C. |
| liquidus viscosity (Internal) kP - | 1446 | 646 | 2294 | 3290 | 1015 |

TABLE 3C

| Properties | C10 | C11 | C12 | C13 | C14 | C15 |
|---|---|---|---|---|---|---|
| Density | 2.484 | 2.474 | 2.464 | 2.489 | 2.480 | 2.469 |
| CTE (0-300° C.) ppm/° C. | 95.10 | 91.50 | 88.30 | 92.40 | 89.80 | 86.30 |
| Stain Point (fiber Elongation) | 607.0 | 608.0 | 611.0 | 612.0 | 613.0 | 613.0 |
| Annealing Point (fiber Elongation) | 658.0 | 660.0 | 664.0 | 663.0 | 664.0 | 666.0 |
| Softening Point (fiber Elongation) | 891.2 | 899.1 | 907.6 | 899.7 | 906.8 | 913.4 |
| 10^11 Poises | 740 | 745 | 745 | 745 | 745 | 750 |
| Young's modulus (GPa) | 72.7 | 72.4 | 72.2 | 73.1 | 73.2 | 72.8 |
| Shear modulus (GPa) | 29.9 | 29.9 | 29.9 | 30.1 | 30.1 | 30.1 |
| Poisson's ratio | 0.216 | 0.213 | 0.210 | 0.214 | 0.214 | 0.212 |
| RI @ 589.3 | 1.5127 | 1.5101 | 1.5078 | 1.5142 | 1.5118 | 1.5093 |

TABLE 3C-continued

| Properties | C10 | C11 | C12 | C13 | C14 | C15 |
|---|---|---|---|---|---|---|
| SOC (546.1 nm) single PT | 2.897 | 2.925 | 2.955 | 2.885 | 2.93 | 2.955 |
| VFT parameters from HTV | | | | | | |
| A | −3.017 | −3.128 | −3.157 | −3.225 | −2.962 | −3.272 |
| B | 7856.4 | 8207.0 | 8460.7 | 8337.7 | 7875.3 | 8780.0 |
| To | 125.5 | 111.6 | 101.9 | 106.0 | 135.2 | 83.9 |
| Liquidus (gradient boat) | | | | | | |
| duration (hours) | 24 | 24 | 24 | 24 | 24 | 24 |
| Air (° C.) | 1190 | 1130 | 1060 | 1215 | 1160 | 1065 |
| internal (° C.) | 1185 | 1120 | 1055 | 1210 | 1150 | 1060 |
| Pt (° C.) | 1180 | 1120 | 1050 | 1205 | 1150 | 1060 |
| primary phase | Unknown | Nepheline | Nepheline | Unknown | Nepheline | Nepheline |
| 2ndry phase | Nepheline up to 1180° C. | — | — | Nepheline up to 1210° C. | — | — |
| liquidus viscosity (Internal) kP | 25 | 102 | 525 | 21 | 63 | 528 |

TABLE 3D

| Properties | C16 | C17 | C18 | C19 | C20 | C21 |
|---|---|---|---|---|---|---|
| Density | 2.489 | 2.482 | 2.467 | 2.489 | 2.480 | 2.470 |
| CTE (0-300° C.) ppm/° C. | 95.90 | 94.30 | 88.70 | 93.60 | 90.70 | 87.40 |
| Stain Point (fiber Elongation) | 596.0 | 588.0 | 602.0 | 602.0 | 602.0 | 604.0 |
| Annealing Point (fiber Elongation) | 646.0 | 638.0 | 654.0 | 652.0 | 653.0 | 656.0 |
| Softening Point (fiber Elongation) | 876.2 | 866.6 | 893.7 | 883.6 | 887.7 | 896.8 |
| 10^11 Poises | 730 | 725 | 740 | 735 | 735 | 740 |
| Young's modulus (GPa) | 73.2 | 72.9 | 72.6 | 73.5 | 73.0 | 72.9 |
| Shear modulus (GPa) | 30.1 | 29.8 | 30.0 | 30.1 | 30.1 | 30.1 |
| Poisson's ratio | 0.218 | 0.222 | 0.210 | 0.221 | 0.215 | 0.212 |
| RI @ 589.3 | 1.5110 | 1.5094 | 1.5068 | 1.5112 | 1.5096 | 1.5078 |
| SOC (546.1 nm) single PT | 2.866 | 2.892 | 2.95 | 2.887 | 2.909 | 2.943 |
| VFT parameters from HTV | | | | | | |
| A | −2.803 | −2.796 | −2.838 | −2.997 | −3.069 | −3.181 |
| B | 7293.8 | 7489.8 | 7752.9 | 7751.2 | 8127.4 | 8504.2 |
| To | 139.6 | 122.4 | 129.1 | 126.9 | 102.7 | 81.4 |
| Liquidus (gradient boat) | | | | | | |
| duration (hours) | 24 | 24 | 24 | 24 | 24 | 24 |
| Air (° C.) | 1200 | 1115 | 1035 | 1185 | 1115 | 1045 |
| internal (° C.) | 1190 | 1110 | 1030 | 1175 | 1110 | 1035 |
| Pt (° C.) | 1175 | 1105 | 1020 | 1170 | 1110 | 1025 |
| primary phase | Unknown | Unknown | Nepheline | Unknown | Nepheline | Nepheline |
| 2ndry phase | Nepheline up to 1190° C. | Nepheline up to 1105° C. | Cassiterite up to 1080° C. | Nepheline up to 1175° C. | — | — |
| liquidus viscosity (Internal) kP | 14 | 61 | 586 | 25 | 100 | 546 |

TABLE 3E

| Properties | C22 | C23 | C24 | C25 | C26 | C27 |
|---|---|---|---|---|---|---|
| Density | 2.487 | 2.478 | 2.468 | 2.492 | 2.483 | 2.473 |
| CTE (0-300° C.) ppm/° C. | 95.50 | 92.30 | 88.40 | 93.40 | 91.70 | 87.20 |

TABLE 3E-continued

| Properties | C22 | C23 | C24 | C25 | C26 | C27 |
|---|---|---|---|---|---|---|
| Stain Point (fiber Elongation) | 590.0 | 590.0 | 593.0 | 594.0 | 594.0 | 597.0 |
| Annealing Point (fiber Elongation) | 640.0 | 641.0 | 645.0 | 643.0 | 644.0 | 649.0 |
| Softening Point (fiber Elongation) | 864.5 | 868.1 | 874.5 | 868.5 | 872.4 | 882.4 |
| 10^11 Poises | 730 | 730 | 730 | 730 | 730 | 735 |
| Young's modulus (GPa) | 72.6 | 72.3 | 71.9 | 73.4 | 72.9 | 72.8 |
| Shear modulus (GPa) | 29.7 | 29.8 | 29.7 | 30.1 | 30.1 | 30.1 |
| Poisson's ratio | 0.221 | 0.214 | 0.211 | 0.217 | 0.213 | 0.212 |
| RI @ 589.3 | 1.5105 | 1.5088 | 1.5069 | 1.5120 | 1.5103 | 1.5085 |
| SOC (546.1 nm) single PT | 2.865 | 2.904 | 2.940 | 2.868 | 2.887 | 2.931 |
| VFT parameters from HTV | | | | | | |
| A | −2.653 | −2.739 | −2.498 | −2.966 | −2.757 | −3.020 |
| B | 6900.0 | 7333.8 | 6933.8 | 7574.3 | 7364.1 | 8129.4 |
| To | 174.8 | 137.5 | 178.9 | 134.3 | 144.3 | 94.9 |
| Liquidus (gradient boat) | | | | | | |
| duration (hours) | 24 | 24 | 24 | 24 | 24 | 24 |
| Air (° C.) | 1185 | 1105 | 1025 | 1165 | 1105 | 1020 |
| internal (° C.) | 1170 | 1095 | 1020 | 1160 | 1095 | 1015 |
| Pt (° C.) | 1165 | 1090 | 1020 | 1150 | 1085 | 1000 |
| primary phase | Unknown | Nepheline | Nepheline | Nepheline | Nepheline | Nepheline |
| 2ndry phase | Nepheline up to 1175° C. | — | — | Unknown up to 1165° C. | — | — |
| liquidus viscosity (Internal) kP | 19 | 83 | 557 | 26 | 97 | 654 |

TABLE 3F

| Properties | C28 | C29 | C30 | C31 |
|---|---|---|---|---|
| Density | 2.469 | 2.468 | 2.463 | 2.484 |
| CTE (0-300° C.) ppm/° C. | 87.07 | 87.20 | 87.41 | 87.91 |
| Stain Point (fiber Elongation) | 589.5 | 585.2 | 579.3 | 583.3 |
| Annealing Point (fiber Elongation) | 642.2 | 637.7 | 631.6 | 636.5 |
| Softening Point (fiber Elongation) | 877.9 | 872.9 | 865.1 | 868.2 |
| 10^11 Poises | 725 | 720 | 715 | 720 |
| Young's modulus (GPa) | 72.7 | 72.6 | 72.5 | 73.2 |
| Shear modulus (GPa) | 30.1 | 30.1 | 30.0 | 30.3 |
| Poisson's ratio | 0.209 | 0.208 | 0.209 | 0.207 |
| RI @ 589.3 | 1.5086 | 1.5082 | 1.5085 | 1.5099 |
| SOC (546.1 nm) single PT | 2.916 | 2.905 | 2.889 | 2.886 |
| VFT parameters from HTV | | | | |
| A | −2.875 | −2.636 | −2.245 | −3.087 |
| B | 7825.5 | 7394.1 | 6581.4 | 8339.3 |
| To | 113.9 | 130.1 | 180.6 | 59.9 |
| Liquidus (gradient boat) | | | | |
| duration (hours) | 24 | 24 | 24 | 24 |
| Air (° C.) | 1030 | 1010 | 995 | 1025 |
| internal (° C.) | 1025 | 1000 | 990 | 1015 |
| Pt (° C.) | 1010 | 995 | 985 | 1010 |
| primary phase | Nepheline | Nepheline | Nepheline | Nepheline |
| 2ndry phase | — | Forsterite up to 950° C. | Forsterite up to 935° C. | — |
| liquidus viscosity (Internal) kP | 518 | 731 | 769 | 440 |

TABLE 3G

| Properties | C32 | C33 | C34 | C35 | C36 |
|---|---|---|---|---|---|
| Density | 2.470 | 2.473 | 2.458 | 2.474 | 2.465 |
| CTE (0-300° C.) ppm/° C. | 86.52 | 86.90 | 86.23 | 88.62 | 88.34 |
| Stain Point (fiber Elongation) | 581.0 | 577.8 | 589.2 | 581.8 | 576.3 |
| Annealing Point (fiber Elongation) | 634.2 | 630.7 | 642.1 | 634.0 | 628.3 |
| Softening Point (fiber Elongation) | 867.3 | 863.5 | 877.8 | 866.9 | 860.2 |
| 10^11 Poises | 715 | 715 | 725 | 715 | 710 |
| Young's modulus (GPa) | 73.0 | 72.9 | 72.8 | 72.6 | 72.5 |

TABLE 3G-continued

| Properties | C32 | C33 | C34 | C35 | C36 |
|---|---|---|---|---|---|
| Shear modulus (GPa) | 30.3 | 30.2 | 30.1 | 30.0 | 29.9 |
| Poisson's ratio | 0.207 | 0.206 | 0.210 | 0.209 | 0.210 |
| RI @ 589.3 | 1.5095 | 1.5092 | 1.5092 | 1.5083 | 1.5088 |
| SOC (546.1 nm) single PT | 2.871 | 2.887 | 2.890 | 2.880 | 2.877 |
| VFT parameters from HTV | | | | | |
| A | −2.683 | −2.639 | −2.544 | −2.525 | −2.070 |
| B | 7403.9 | 7437.7 | 6970.8 | 7214.2 | 6249.6 |
| To | 134.8 | 114.1 | 193.4 | 124.9 | 195.1 |
| Liquidus (gradient boat) | | | | | |
| duration (hours) | 24 | 24 | 24 | 24 | 24 |
| Air (° C.) | 995 | 1005 | 1040 | 1005 | 1005 |
| internal (° C.) | 995 | 990 | 1030 | 995 | 1000 |
| Pt (° C.) | 985 | 985 | 1020 | 980 | 985 |
| primary phase | Nepheline | Nepheline | Nepheline | Nepheline | Nepheline |
| 2ndry phase | Forsterite up to 960° C. | Forsterite up to 990° C. | — | — | Forsterite up to 920° C. |
| liquidus viscosity (Internal) kP | 841 | 711 | 614 | 583 | 494 |

TABLE 3H

| Properties | C37 | C38 | C39 | C40 | C41 | C42 |
|---|---|---|---|---|---|---|
| Density | 2.463 | 2.465 | 2.466 | 2.466 | 2.468 | 2.469 |
| CTE (0-300° C.) ppm/° C. | 84.06 | 85.49 | 85.90 | 83.99 | 84.86 | 85.66 |
| Stain Point (fiber Elongation) | 612.4 | 607.7 | 606.1 | 605.0 | 601.9 | 599.1 |
| Annealing Point (fiber Elongation) | 665.3 | 660.2 | 658.5 | 657.9 | 654.6 | 651.6 |
| Softening Point (fiber Elongation) | 913.0 | 904.9 | 902.7 | 905.5 | 900.3 | 895.7 |
| 10^11 Poises | 755 | 750 | 750 | 750 | 750 | 745 |
| Young's modulus (GPa) | 72.7 | 72.8 | 72.6 | 72.7 | 72.9 | 72.8 |
| Shear modulus (GPa) | 30.1 | 30.1 | 30.0 | 30.1 | 30.1 | 30.1 |
| Poisson's ratio | 0.208 | 0.210 | 0.211 | 0.210 | 0.211 | 0.211 |
| RI @ 589.3 | 1.5065 | 1.5071 | 1.5071 | 1.5072 | 1.5076 | 1.5077 |
| SOC (546.1 nm) single PT | 2.939 | 2.93 | 2.918 | 2.94 | 2.921 | 2.912 |
| VFT parameters from HTV | | | | | | |
| A | −3.103 | −3.147 | −3.271 | −3.174 | −3.012 | −2.928 |
| B | 8451.7 | 8630.9 | 8726.1 | 8687.1 | 8271.4 | 8111.9 |
| To | 103.7 | 78.0 | 84.4 | 75.4 | 98.6 | 99.7 |
| Liquidus (gradient boat) | | | | | | |
| duration (hours) | 72 | 72 | 72 | 72 | 72 | 72 |
| Air (° C.) | 1130 | 1115 | 1100 | 1100 | 1025 | 1075 |
| internal (° C.) | 1020 | 1030 | 1040 | 1010 | 1025 | 1020 |
| Pt (° C.) | 1020 | 1025 | 1035 | 1010 | 1020 | 1020 |
| primary phase | Nepheline | Nepheline | Nepheline | Nepheline | Nepheline | Nepheline |
| 2ndry phase | Forsterite | Forsterite | — | — | — | — |
| liquidus viscosity (Internal) kP | 1320 | 830 | 725 | 1321 | 825 | 770 |

TABLE 3I

| Properties | C43 | C44 | C45 | C46 | C47 | C48 |
|---|---|---|---|---|---|---|
| Density | 2.460 | 2.458 | 2.457 | 2.462 | 2.461 | 2.463 |
| CTE (0-300° C.) ppm/° C. | 84.93 | 84.09 | 83.22 | 84.56 | 83.79 | 83.05 |
| Stain Point (fiber Elongation) | 616.5 | 622.7 | 629.2 | 618.9 | 624.8 | 623.3 |
| Annealing Point (fiber Elongation) | 669.0 | 675.7 | 682.8 | 672.2 | 678.5 | 677.5 |
| Softening Point (fiber Elongation) | 915.8 | 922.6 | 930.2 | 916.2 | 922.7 | 921.6 |
| 10^11 Poises | 760 | 765 | 770 | 760 | 765 | 765 |
| Young's modulus (GPa) | 72.4 | 72.5 | 72.6 | 72.7 | 72.8 | 73.1 |
| Shear modulus (GPa) | 29.9 | 30.0 | 30.0 | 30.0 | 30.0 | 30.2 |
| Poisson's ratio | 0.210 | 0.211 | 0.212 | 0.211 | 0.212 | 0.211 |
| RI @ 589.3 | 1.5057 | 1.5055 | 1.5054 | 1.5064 | 1.5062 | 1.5069 |
| SOC (546.1 nm) single PT | 2.943 | 2.956 | 2.960 | 2.928 | 2.940 | 2.931 |
| VFT parameters from HTV | | | | | | |
| A | −3.284 | −3.247 | −3.166 | −2.985 | −3.046 | −3.129 |
| B | 8841.8 | 8725.7 | 8373.1 | 8025.7 | 8080.3 | 8340.4 |
| To | 75.8 | 100.3 | 138.5 | 140.0 | 144.5 | 124.2 |
| Liquidus (gradient boat) | | | | | | |
| duration (hours) | 72 | 72 | 72 | 72 | 72 | 72 |
| Air (° C.) | 1130 | 1100 | 1115 | 1035 | 1060 | 1050 |
| internal (° C.) | 1030 | 1020 | 1065 | 1045 | 1055 | 1045 |
| Pt (° C.) | 1010 | 1015 | 1060 | 1035 | 1045 | 1035 |
| primary phase | Nepheline | Nepheline | Forsterite | Nepheline | Forsterite | Forsterite |
| 2ndry phase | — | Forsterite | — | Forsterite up to 1005° C. | — | Nepheline up to 1025° C. |
| liquidus viscosity (Internal) kP | 960 | 1740 | 744 | 764 | 674 | 849 |

TABLE 3J

| Properties | C49 | C50 |
|---|---|---|
| Density | 2.458 | 2.463 |
| CTE (0-300° C.) ppm/° C. | 8.51 | 8.51 |
| Stain Point (fiber Elongation) | 620.0 | 614.0 |
| Annealing Point (fiber Elongation) | 674.0 | 666.0 |
| Softening Point (fiber Elongation) | 923.8 | 912.6 |
| low-T CTE in ppm/° C. (from CTE bar at 500° C. cooling) | 9.03 | 9.04 |
| low-T CTE in ppm/° C. (from CTE bar at 300° C. cooling) | 8.67 | 8.71 |
| low-T CTE in ppm/° C. (from CTE bar at 50° C. cooling) | 7.95 | 7.96 |
| High-T CTE in ppm | 20.86 | 20.96 |
| Strain PT (BBV) (10^14.68 P) | 623.1 | 611.9 |
| Annealing PT (BBV) (10^13.18 P) | 673 | 662.2 |
| Soft PT(PPV) (10^7.6 P) | 921.5 | 909.2 |
| Young's modulus (GPa) | 72.7 | 73.3 |
| Shear modulus (GPa) | 30.1 | 30.1 |
| Poisson's ratio | 0.208 | 0.218 |
| RI @ 589.3 | 1.5058 | 1.5067 |
| SOC (546.1 nm) single PT | 2.956 | 2.944 |
| VFT parameters from HTV | | |
| A | −3.180 | −3.102 |
| B | 8463.3 | 8484.4 |
| To | 121.0 | 101.1 |
| Liquidus (gradient boat) | | |
| duration (hours) | 72 | 72 |
| Air (° C.) | 1045 | 1020 |
| internal (° C.) | 1035 | 1015 |
| Pt (° C.) | 1025 | 1010 |
| primary phase | Nepheline | Nepheline |
| 2ndry phase | Forsterite up to 1015° C. | Forsterite up to 970° C. |
| liquidus viscosity (Internal) kP | 1201 | 1520 |

TABLE 4A

| | 410° C. 100% KNO₃ | | | | | | | | | |
|---|---|---|---|---|---|---|---|---|---|---|
| | C1 | C2 | C3 | C4 | C5 | C6 | C7 | C8 | C9 | CA |
| Time (hours) | 0.25 | 0.25 | 0.25 | 0.25 | 0.25 | 0.25 | 0.25 | 0.25 | 0.25 | 0.25 |
| CS (MPa) | 1221 | 1192 | 1196 | 1168 | 1190 | 1192 | 1157 | 1126 | 1167 | 998 |
| DOC (μm) | 9.2 | 9.0 | 9.1 | 9.2 | 9.2 | 9.1 | 9.0 | 9.3 | 9.3 | 9.0 |

TABLE 4A-continued

410° C. 100% KNO₃

|  | C1 | C2 | C3 | C4 | C5 | C6 | C7 | C8 | C9 | CA |
|---|---|---|---|---|---|---|---|---|---|---|
| CS/E (MPa/GPa) | 16.6 | 16.2 | 16.2 | 16.0 | 16.3 | 16.3 | 16.0 | 15.5 | 16.0 | 14.0 |
| Time (hours) | 0.5 | 0.5 | 0.5 | 0.5 | 0.5 | 0.5 | 0.5 | 0.5 | 0.5 | 0.5 |
| CS (MPa) | 1246 | 1248 | 1256 | 1208 | 1216 | 1228 | 1159 | 1162 | 1200 | 1017 |
| DOC (μm) | 12.4 | 12.5 | 12.2 | 12.8 | 12.8 | 12.4 | 12.7 | 12.7 | 12.6 | 12.0 |
| CS/E (MPa/GPa) | 16.9 | 16.9 | 17.0 | 16.5 | 16.6 | 16.8 | 16.0 | 16.0 | 16.5 | 14.3 |
| Time (hours) | 1.0 | 1.0 | 1.0 | 1.0 | 1.0 | 1.0 | 1.0 | 1.0 | 1.0 | 1.0 |
| CS (MPa) | 1253 | 1236 | 1239 | 1206 | 1215 | 1217 | 1166 | 1150 | 1184 | 1018 |
| DOC (μm) | 17.3 | 17.3 | 16.9 | 18.3 | 17.5 | 17.3 | 17.7 | 17.2 | 17.4 | 17.3 |
| CS/E (MPa/GPa) | 17.0 | 16.8 | 16.7 | 16.5 | 16.6 | 16.6 | 16.1 | 15.8 | 16.3 | 14.3 |
| Time (hours) | 2.0 | 2.0 | 2.0 | 2.0 | 2.0 | 2.0 | 2.0 | 2.0 | 2.0 | 2.0 |
| CS (MPa) | 1241 | 1236 | 1207 | 1205 | 1208 | 1217 | 1137 | 1151 | 1167 | 999 |
| DOC (μm) | 24.7 | 24.3 | 25 | 24.9 | 24.8 | 24.7 | 24.9 | 24.7 | 24.9 | 23.9 |
| CS/E (MPa/GPa) | 16.9 | 16.8 | 16.3 | 16.5 | 16.5 | 16.6 | 15.7 | 15.8 | 16.0 | 14.0 |

TABLE 4B

410° C. 100% KNO₃

|  | C10 | C11 | C12 | C13 | C14 | C15 | CA |
|---|---|---|---|---|---|---|---|
| Time (hours) | 0.25 | 0.25 | 0.25 | 0.25 | 0.25 | 0.25 | 0.25 |
| CS (MPa) | 1265 | 1236 | 1187 | 1260 | 1230 | 1187 | 984 |
| DOC (μm) | 9.7 | 9.6 | 9.3 | 9.0 | 8.9 | 8.6 | 8.8 |
| CS/E (MPa/GPa) | 17.4 | 17.1 | 16.4 | 17.2 | 16.8 | 16.3 | 13.8 |
| Time (hours) | 0.5 | 0.5 | 0.5 | 0.5 | 0.5 | 0.5 | 0.5 |
| CS (MPa) | 1298 | 1244 | 1186 | 1284 | 1237 | 1182 | 1008 |
| DOC (μm) | 13.2 | 12.9 | 13.3 | 12.3 | 11.7 | 12.4 | 11.9 |
| CS/E (MPa/GPa) | 17.8 | 17.2 | 16.4 | 17.6 | 16.9 | 16.2 | 14.1 |
| Time (hours) | 1.0 | 1.0 | 1.0 | 1.0 | 1.0 | 1.0 | 1.0 |
| CS (MPa) | 1242 | 1226 | 1188 | 1273 | 1231 | 1177 | 1010 |
| DOC (μm) | 19.1 | 18.8 | 18.6 | 17.1 | 17.0 | 17.2 | 17.4 |
| CS/E (MPa/GPa) | 17.1 | 16.9 | 16.5 | 17.4 | 16.8 | 16.2 | 14.2 |
| Time (hours) | 2.0 | 2.0 | 2.0 | 2.0 | 2.0 | 2.0 | 2.0 |
| CS (MPa) | 1180 | 1200 | 1162 | 1248 | 1200 | 1173 | 996 |
| DOC (μm) | 27.2 | 25.4 | 25.4 | 23.4 | 23.5 | 23.4 | 24.0 |
| CS/E (MPa/GPa) | 16.2 | 16.6 | 16.1 | 17.1 | 16.4 | 16.1 | 14.0 |

TABLE 4C

410° C. 100% KNO₃

|  | C16 | C17 | C18 | C19 | C20 | C21 | CA |
|---|---|---|---|---|---|---|---|
| Time (hours) | 0.25 | 0.25 | 0.25 | 0.25 | 0.25 | 0.25 | 0.25 |
| CS (MPa) | 1276 | 1217 | 1180 | 1254 | 1199 | 1135 | 981 |
| DOC (μm) | 9.0 | 9.2 | 8.7 | 8.6 | 8.5 | 8.4 | 8.8 |
| CS/E (MPa/GPa) | 17.4 | 16.7 | 16.3 | 17.1 | 16.4 | 15.6 | 13.8 |
| Time (hours) | 0.5 | 0.5 | 0.5 | 0.5 | 0.5 | 0.5 | 0.5 |
| CS (MPa) | 1247 | 1201 | 1176 | 1284 | 1233 | 1180 | 980 |
| DOC (μm) | 12.3 | 12.3 | 11.7 | 11.5 | 11.3 | 11.4 | 11.8 |
| CS/E (MPa/GPa) | 17.0 | 16.5 | 16.2 | 17.5 | 16.9 | 16.2 | 13.7 |
| Time (hours) | 1.0 | 1.0 | 1.0 | 1.0 | 1.0 | 1.0 | 1.0 |
| CS (MPa) | 1251 | 1163 | 1168 | 1249 | 1223 | 1168 | 1009 |
| DOC (μm) | 17.2 | 17.2 | 17 | 16.5 | 15.5 | 15.4 | 17.1 |
| CS/E (MPa/GPa) | 17.1 | 16.0 | 16.1 | 17.0 | 16.7 | 16.0 | 14.2 |
| Time (hours) | 2.0 | 2.0 | 2.0 | 2.0 | 2.0 | 2.0 | 2.0 |
| CS (MPa) | 1234 | 1165 | 1147 | 1238 | 1207 | 1152 | 994 |
| DOC (μm) | 23.6 | 23.7 | 23.7 | 23.3 | 22.2 | 22.2 | 23.8 |
| CS/E (MPa/GPa) | 16.9 | 16.0 | 15.8 | 16.8 | 16.5 | 15.8 | 13.9 |

TABLE 4D

410° C. 100% KNO₃

| | C22 | C23 | C24 | C25 | C26 | C27 | CA |
|---|---|---|---|---|---|---|---|
| Time (hours) | 0.25 | 0.25 | 0.25 | 0.25 | 0.25 | 0.25 | 0.25 |
| CS (MPa) | 1264 | 1218 | 1168 | 1269 | 1206 | 1149 | 977 |
| DOC (μm) | 8.9 | 8.7 | 8.5 | 7.9 | 7.8 | 7.4 | 8.7 |
| CS/E (MPa/GPa) | 17.4 | 16.8 | 16.2 | 17.3 | 16.5 | 15.8 | 13.7 |
| Time (hours) | 0.5 | 0.5 | 0.5 | 0.5 | 0.5 | 0.5 | 0.5 |
| CS (MPa) | 1253 | 1227 | 1167 | 1243 | 1229 | 1170 | 997 |
| DOC (μm) | 12.5 | 11.5 | 11.4 | 11.0 | 10.7 | 10.7 | 11.7 |
| CS/E (MPa/GPa) | 17.3 | 17.0 | 16.2 | 16.9 | 16.9 | 16.1 | 14.0 |
| Time (hours) | 1.0 | 1.0 | 1.0 | 1.0 | 1.0 | 1.0 | 1.0 |
| CS (MPa) | 1236 | 1180 | 1151 | 1255 | 1222 | 1165 | 1006 |
| DOC (μm) | 17.1 | 17.2 | 16.7 | 15.3 | 15.3 | 14.8 | 17.1 |
| CS/E (MPa/GPa) | 17.0 | 16.3 | 16.0 | 17.1 | 16.8 | 16.0 | 14.1 |
| Time (hours) | 2.0 | 2.0 | 2.0 | 2.0 | 2.0 | 2.0 | 2.0 |
| CS (MPa) | 1202 | 1154 | 1107 | 1191 | 1174 | 1124 | 996 |
| DOC (μm) | 23.4 | 23.7 | 23.4 | 22.9 | 21.8 | 21.4 | 23.7 |
| CS/E (MPa/GPa) | 16.6 | 16.0 | 15.4 | 16.2 | 16.1 | 15.4 | 14.0 |

TABLE 4E

410° C. - 100% KNO₃

| | C28 | C29 | C30 | C31 | C32 | C33 | C34 | C35 | C36 | CA |
|---|---|---|---|---|---|---|---|---|---|---|
| Time (hours) | 0.25 | 0.25 | 0.25 | 0.25 | 0.25 | 0.25 | 0.25 | 0.25 | 0.25 | 0.25 |
| CS (MPa) | 1126 | 1115 | 1125 | 1124 | 1140 | 1081 | 1134 | 1108 | 1109 | 975 |
| DOC (μm) | 7.8 | 7.7 | 7.7 | 7.3 | 7.3 | 7.4 | 7.9 | 7.8 | 7.6 | 8.9 |
| CS/E (MPa/GPa) | 15.5 | 15.3 | 15.5 | 15.4 | 15.6 | 14.8 | 15.6 | 15.3 | 15.3 | 13.7 |
| Time (hours) | 0.5 | 0.5 | 0.5 | 0.5 | 0.5 | 0.5 | 0.5 | 0.5 | 0.5 | 0.5 |
| CS (MPa) | 1148 | 1139 | 1111 | 1145 | 1139 | 1117 | 1161 | 1153 | 1121 | 1009 |
| DOC (μm) | 11.0 | 10.8 | 11.0 | 10.1 | 9.9 | 10.0 | 10.9 | 10.9 | 10.9 | 12.1 |
| CS/E (MPa/GPa) | 15.8 | 15.7 | 15.3 | 15.6 | 15.6 | 15.3 | 16.0 | 15.9 | 15.5 | 14.1 |
| Time (hours) | 1.0 | 1.0 | 1.0 | 1.0 | 1.0 | 1.0 | 1.0 | 1.0 | 1.0 | 1.0 |
| CS (MPa) | 1134 | 1115 | — | — | — | — | — | — | — | 1003 |
| DOC (μm) | 14.9 | 14.9 | — | — | — | — | — | — | — | 17.1 |
| CS/E (MPa/GPa) | 15.6 | 15.4 | — | — | — | — | — | — | — | 14.1 |

TABLE 4F

410° C. - 100% KNO₃

| | C37 | C38 | C39 | C40 | C41 | C42 | CA |
|---|---|---|---|---|---|---|---|
| Time (hours) | 0.25 | 0.25 | 0.25 | 0.25 | 0.25 | 0.25 | 0.25 |
| CS (MPa) | 1154 | 1150 | 1173 | 1131 | 1126 | 1152 | 969 |
| DOC (μm) | 8.5 | 8.6 | 8.4 | 8.0 | 8.0 | 7.8 | 8.7 |
| CS/E (MPa/GPa) | 15.9 | 15.8 | 16.2 | 15.6 | 15.4 | 15.8 | 13.6 |
| Time (hours) | 0.5 | 0.5 | 0.5 | 0.5 | 0.5 | 0.5 | 0.5 |
| CS (MPa) | 1162 | 1149 | 1181 | 1142 | 1141 | 1157 | — |
| DOC (μm) | 11.3 | 11.6 | 11.3 | 11.0 | 11.0 | 11.0 | — |
| CS/E (MPa/GPa) | 16.0 | 15.8 | 16.3 | 15.7 | 15.7 | 15.9 | — |
| Time (hours) | 1.0 | 1.0 | 1.0 | 1.0 | 1.0 | 1.0 | 1.0 |
| CS (MPa) | 1167 | 1177 | 1185 | 1148 | 1149 | 1159 | 1006 |
| DOC (μm) | 15.9 | 15.7 | 15.7 | 15.5 | 15.2 | 15.2 | 17.0 |
| CS/E (MPa/GPa) | 16.1 | 16.2 | 16.3 | 15.8 | 15.8 | 15.9 | 14.1 |
| Time (hours) | 2.0 | 2.0 | 2.0 | 2.0 | 2.0 | 2.0 | 3.0 |
| CS (MPa) | 1166 | 1134 | 1146 | 1136 | 1133 | 1120 | 992 |
| DOC (μm) | 22.7 | 23.1 | 22.9 | 21.5 | 21.4 | 21.8 | 23.6 |
| CS/E (MPa/GPa) | 16.0 | 15.6 | 15.8 | 15.6 | 15.5 | 15.4 | 13.9 |

TABLE 4G

| | C43 | C44 | C45 | C46 | C47 | C48 | CA |
|---|---|---|---|---|---|---|---|
| 410° C. - 100% KNO₃ | | | | | | | |
| Time (hours) | 0.25 | 0.25 | 0.25 | 0.25 | 0.25 | 0.25 | 0.25 |
| CS (MPa) | 1186 | 1194 | 1189 | 1170 | 1194 | 1168 | 964 |
| DOC (μm) | 8.8 | 8.7 | 8.8 | 8.6 | 8.4 | 8.0 | 8.5 |
| CS/E (MPa/GPa) | 16.4 | 16.5 | 16.4 | 16.1 | 16.4 | 16.0 | 13.5 |
| Time (hours) | 0.5 | 0.5 | 0.5 | 0.5 | 0.5 | 0.5 | 0.5 |
| CS (MPa) | 1185 | 1196 | 1211 | 1188 | 1200 | 1189 | 999 |
| DOC (μm) | 11.5 | 11.7 | 11.9 | 11.3 | 11.3 | 10.7 | 11.4 |
| CS/E (MPa/GPa) | 16.4 | 16.5 | 16.7 | 16.3 | 16.5 | 16.3 | 14.0 |
| Time (hours) | 1.0 | 1.0 | 1.0 | 1.0 | 1.0 | 1.0 | 1.0 |
| CS (MPa) | 1180 | 1180 | 1199 | 1201 | 1207 | 1191 | 1000 |
| DOC (μm) | 17.1 | 17.5 | 17.5 | 16.7 | 16.9 | 15.7 | 17.2 |
| CS/E (MPa/GPa) | 16.3 | 16.3 | 16.5 | 16.5 | 16.6 | 16.3 | 14.0 |
| Time (hours) | 2.0 | 2.0 | 2.0 | 2.0 | 2.0 | 2.0 | 2.0 |
| CS (MPa) | 1164 | 1187 | 1177 | 1177 | 1190 | 1188 | 993 |
| DOC (μm) | 23.7 | 23.6 | 25.1 | 23.5 | 23.4 | 22.6 | 23.8 |
| CS/E (MPa/GPa) | 16.1 | 16.4 | 16.2 | 16.2 | 16.3 | 16.3 | 13.9 |

While various aspects have been described herein, they have been presented by way of example, and not limitation. It should be apparent that adaptations and modifications are intended to be within the meaning and range of equivalents of the disclosed aspects, based on the teaching and guidance presented herein. It therefore will be apparent to one skilled in the art that various changes in form and detail can be made to the aspects disclosed herein without departing from the spirit and scope of the present disclosure. The elements of aspects presented herein are not necessarily mutually exclusive, but may be interchanged to meet various situations as would be appreciated by one of skill in the art.

Aspects of the present disclosure are described in detail herein with reference to aspects thereof as illustrated in the accompanying drawings, in which like reference numerals are used to indicate identical or functionally similar elements. References to "aspects" or "an aspect" indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The examples are illustrative, but not limiting, of the present disclosure. Other suitable modifications and adaptations of the variety of conditions and parameters normally encountered in the field, and which would be apparent to those skilled in the art, are within the spirit and scope of the disclosure.

The indefinite articles "a" and "an" to describe an element or component means that one or more than one of these elements or components is present. Although these articles are conventionally employed to signify that the modified noun is a singular noun, as used herein the articles "a" and "an" also include the plural, unless otherwise stated in specific instances. Similarly, the definite article "the," as used herein, also signifies that the modified noun may be singular or plural, again unless otherwise stated in specific instances.

Directional terms as used herein—for example up, down, right, left, front, back, top, bottom, inward, outward—are made only with reference to the figures as drawn and are not intended to imply absolute orientation.

As used in the claims, "comprising" is an open-ended transitional phrase. A list of elements following the transitional phrase "comprising" is a non-exclusive list, such that elements in addition to those specifically recited in the list may also be present. As used in the claims, "consisting essentially of" or "composed essentially of" limits the composition of a material to the specified materials and those that do not materially affect the basic and novel characteristic(s) of the material. As used in the claims, "consisting of" or "composed entirely of" limits the composition of a material to the specified materials and excludes any material not specified.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to. Whether or not a numerical value or end-point of a range recites "about," the numerical value or end-point of a range is intended to include two aspects: one modified by "about," and one not modified by "about."

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

It is to be understood that the phraseology or terminology used herein is for the purpose of description and not of limitation. The breadth and scope of the present disclosure should not be limited by any of the above-described exemplary aspects, but should be defined in accordance with the following claims and their equivalents.

What is claimed is:

1. An ion-exchanged alkali aluminosilicate glass article, comprising:
    greater than or equal to 55 mol % $SiO_2$;
    greater than or equal to 12.5 mol % to less than or equal to 16.0 mol % $Al_2O_3$;
    greater than or equal to 1 mol % to less than or equal to 3.88 mol % MgO;
    greater than or equal to 0.78 mol % to less than or equal to 3 mol % CaO; and
    $Na_2O$,
    wherein $Al_2O_3$ mol %+RO mol %≥17 mol %,
    wherein RO mol %=MgO mol %+CaO mol %, and
    wherein the glass article is substantially free of ZnO, SrO, BaO, $B_2O_3$, $P_2O_5$, $Li_2O$, and $K_2O$.

2. The ion-exchanged alkali aluminosilicate glass article of claim 1, wherein the glass article comprises:
    a Young's modulus value measured in GPa before being ion-exchanged; and
    a compressive stress layer extending from a surface of the glass article to a depth of compression, the compressive stress layer comprising a peak compressive stress value measured in MPa,
    wherein a ratio of the peak compressive stress value to the Young's modulus value is greater than or equal to 15.

3. The ion-exchanged alkali aluminosilicate glass article of claim 2, wherein the ratio of the peak compressive stress value to the Young's modulus value is greater than or equal to 15 to less than or equal to 18.

4. The ion-exchanged alkali aluminosilicate glass article of claim 2, wherein the Young's modulus value is in a range of greater than or equal to 70 MPa to less than or equal to 80 MPa.

5. The ion-exchanged alkali aluminosilicate glass article of claim 2, wherein the peak compressive stress value is in a range of greater than or equal to 500 MPa to less than or equal to 1300 MPa.

6. The ion-exchanged alkali aluminosilicate glass article of claim 2, wherein the depth of compression is in a range of greater than or equal to 5 microns to less than or equal to 30 microns.

7. The ion-exchanged alkali aluminosilicate glass article of claim 2, wherein the depth of compression is in a range of greater than or equal to 5% to less than or equal to 20% of a thickness of the glass article.

8. The ion-exchanged alkali aluminosilicate glass article of claim 1, wherein $Na_2O$ mol %+RO mol %≥20 mol %.

9. The ion-exchanged alkali aluminosilicate glass article of claim 1, wherein ($Na_2O$ mol %+RO mol %−$Al_2O_3$ mol %)≥4 mol %.

10. The ion-exchanged alkali aluminosilicate glass article of claim 1, wherein 11 mol %≥($Na_2O$ mol %+RO mol %−$Al_2O_3$ mol %)≥4 mol %.

11. The ion-exchanged alkali aluminosilicate glass article of claim 1, wherein 21 mol %≥$Al_2O_3$ mol %+RO mol %≥17 mol %.

12. The ion-exchanged alkali aluminosilicate glass article of claim 1, wherein 37 mol %≥$Al_2O_3$ mol %+$Na_2O$ mol %≥28 mol %.

13. The ion-exchanged alkali aluminosilicate glass article of claim 1, wherein (MgO mol %/(MgO mol %+CaO mol %))≥0.5.

14. The ion-exchanged alkali aluminosilicate glass article of claim 1, wherein 0.8≥(MgO mol %/(MgO mol %+CaO mol %))≥0.5.

15. The ion-exchanged alkali aluminosilicate glass article of claim 1, comprising:
    greater than or equal to 1.92 mol % to less than or equal to 3.88 mol % MgO.

16. The ion-exchanged alkali aluminosilicate glass article of claim 1, comprising:
    greater than or equal to 0.78 mol % to less than or equal to 2.52 mol % CaO.

17. The ion-exchanged alkali aluminosilicate glass article of claim 1, comprising:
    greater than or equal to 59 mol % to less than or equal to 66 mol % $SiO_2$; and
    greater than or equal to 16 mol % to less than or equal to 21 mol % $Na_2O$.

18. The ion-exchanged alkali aluminosilicate glass article of claim 1, comprising:
    greater than or equal to 64 mol % to less than or equal to 66 mol % $SiO_2$;
    greater than or equal to 13 mol % to less than or equal to 15 mol % $Al_2O_3$;
    greater than or equal to 2 mol % to less than or equal to 3.88 mol % MgO;
    greater than or equal to 0.78 mol % to less than or equal to 2 mol % CaO; and
    greater than or equal to 15.5 mol % to less than or equal to 17.5 mol % $Na_2O$.

19. The ion-exchanged alkali aluminosilicate glass article of claim 1, comprising:
    greater than or equal to 59.6 mol % to less than or equal to 65.5 mol % $SiO_2$;
    greater than or equal to 12.78 mol % to less than or equal to 15.96 mol % $Al_2O_3$;
    greater than or equal to 1.92 mol % to less than or equal to 3.88 mol % MgO;
    greater than or equal to 0.78 mol % to less than or equal to 2.52 mol % CaO; and
    greater than or equal to 16.09 mol % to less than or equal to 20.2 mol % $Na_2O$.

20. The ion-exchanged alkali aluminosilicate glass article of claim 1, comprising a thickness in a range of greater than or equal to 15 microns to less than or equal to 300 microns.

21. The ion-exchanged alkali aluminosilicate glass article of claim 1, comprising a liquidus viscosity in a range of greater than or equal to 500 kP to less than or equal to 2300 kP, measured before being ion-exchanged.

22. The ion-exchanged alkali aluminosilicate glass article of claim 1, wherein the glass article comprises a compressive stress layer extending from a surface of the glass article to a depth of compression, the compressive stress layer comprising a peak compressive stress value in a range of greater than or equal to 500 MPa to less than or equal to 1300 MPa.

* * * * *

UNITED STATES PATENT AND TRADEMARK OFFICE
CERTIFICATE OF CORRECTION

PATENT NO. : 11,820,703 B2
APPLICATION NO. : 17/962772
DATED : November 21, 2023
INVENTOR(S) : Peter Joseph Lezzi Page 1 of 1

It is certified that error appears in the above-identified patent and that said Letters Patent is hereby corrected as shown below:

On the Title Page

Page 2, in Column 1, in item [56], "Related U.S. Patent Documents", Line 13, delete "Ezzi" and insert -- Lezzi --.

Signed and Sealed this
Fourth Day of November, 2025

John A. Squires
*Director of the United States Patent and Trademark Office*